US011085356B2

(12) United States Patent
Mendez Abrego et al.

(10) Patent No.: US 11,085,356 B2
(45) Date of Patent: Aug. 10, 2021

(54) THERMAL MANAGEMENT COOLANT VALVES AND PUMPS MODULAR COMBINATION

(71) Applicant: NIO USA, Inc., San Jose, CA (US)

(72) Inventors: Armando Mendez Abrego, Sunnyvale, CA (US); Joshua Smith, Los Gatos, CA (US); Rick Rajaie, Rochester Hills, MI (US); Dewashish Kanta Prashad, San Jose, CA (US)

(73) Assignee: NIO USA, Inc., San Jose, CA (US)

( * ) Notice: Subject to any disclaimer, the term of this patent is extended or adjusted under 35 U.S.C. 154(b) by 440 days.

(21) Appl. No.: 15/909,281

(22) Filed: Mar. 1, 2018

(65) Prior Publication Data

US 2019/0271258 A1 Sep. 5, 2019

(51) Int. Cl.
*F01P 7/16* (2006.01)
*F01P 5/10* (2006.01)
*F01P 7/14* (2006.01)

(52) U.S. Cl.
CPC .............. *F01P 7/165* (2013.01); *F01P 5/10* (2013.01); *F01P 7/161* (2013.01); *F01P 7/164* (2013.01); *F01P 2005/105* (2013.01); *F01P 2007/146* (2013.01)

(58) Field of Classification Search
CPC .... F01P 7/165; F01P 5/10; F01P 7/161; F01P 7/164; F01P 2005/105; F01P 2007/146
USPC ...................................... 123/41.09
See application file for complete search history.

(56) References Cited

U.S. PATENT DOCUMENTS

| | | | | |
|---|---|---|---|---|
| 2,670,933 A * | 3/1954 | Bay | ....................... | F28D 7/1669 165/297 |
| 3,863,612 A * | 2/1975 | Wiener | ..................... | F01P 3/20 123/41.08 |
| 5,701,852 A * | 12/1997 | Suzuki | .................... | F01P 7/162 123/142.5 R |
| 5,950,576 A * | 9/1999 | Busato | ................ | F16K 11/0743 123/41.08 |
| 6,048,179 A * | 4/2000 | Forster | ..................... | B60K 6/26 417/222.1 |
| 6,098,576 A * | 8/2000 | Nowak, Jr. | ............... | F01P 3/20 123/41.33 |
| 6,196,167 B1 * | 3/2001 | Marsh | ..................... | F01P 7/165 123/41.09 |
| 8,336,319 B2 | 12/2012 | Johnston et al. | | |
| 8,347,831 B2 * | 1/2013 | Vacca | ................... | F16K 11/085 123/41.08 |
| 9,511,645 B2 * | 12/2016 | Johnston | ............. | B60H 1/00921 |
| 9,522,609 B2 * | 12/2016 | Lee | .................... | H01M 8/04768 |
| 9,533,546 B2 | 1/2017 | Cheng | | |
| 9,533,547 B2 | 1/2017 | Cheng | | |
| 9,533,551 B2 * | 1/2017 | Cheng | ................ | B60H 1/00428 |

(Continued)

OTHER PUBLICATIONS

U.S. Appl. No. 15/802,651, filed Nov. 3, 2017, Wong.

(Continued)

*Primary Examiner* — Logan M Kraft
*Assistant Examiner* — John D Bailey
(74) *Attorney, Agent, or Firm* — Sheridan Ross P.C.

(57) ABSTRACT

A thermal management device for use in a vehicular or other thermal management circuit utilizes a pump, one or more valves, and one or more pressure/temperature sensors to route coolant through different desired flow paths and maintain components within the thermal circuit at appropriate temperatures.

8 Claims, 9 Drawing Sheets

(56) References Cited

U.S. PATENT DOCUMENTS

| | | | |
|---|---|---|---|
| 9,539,877 B2 | 1/2017 | Cheng | |
| 2003/0079728 A1* | 5/2003 | Marsh | F01P 7/165 |
| | | | 123/563 |
| 2004/0187805 A1* | 9/2004 | Arisawa | F01P 7/165 |
| | | | 123/41.14 |
| 2004/0237912 A1 | 12/2004 | Pawellek et al. | |
| 2005/0000473 A1* | 1/2005 | Ap | F01P 7/165 |
| | | | 123/41.1 |
| 2012/0183815 A1* | 7/2012 | Johnston | B60K 11/02 |
| | | | 429/50 |
| 2013/0305708 A1* | 11/2013 | Zahdeh | F01P 3/20 |
| | | | 60/599 |
| 2014/0103128 A1* | 4/2014 | Patel | F01P 3/20 |
| | | | 237/5 |
| 2016/0101666 A1 | 4/2016 | Sugimura et al. | |
| 2016/0107503 A1* | 4/2016 | Johnston | B60H 1/32284 |
| | | | 165/202 |
| 2016/0215678 A1* | 7/2016 | Fedewa | F01P 3/20 |
| 2016/0341100 A1* | 11/2016 | Nagai | F01P 7/16 |
| 2018/0100711 A1* | 4/2018 | Bonkoski | F28F 27/02 |
| 2018/0264913 A1* | 9/2018 | Enomoto | F01P 7/161 |
| 2019/0176572 A1* | 6/2019 | Kim | B60H 1/00428 |

OTHER PUBLICATIONS

U.S. Appl. No. 16/107,885, filed Aug. 21, 2018, Wong.
Official Action for U.S. Appl. No. 16/107,885, dated Apr. 7, 2020 9 pages.
Notice of Allowance for U.S. Appl. No. 16/107,885, dated Jul. 22, 2020 8 pages.

* cited by examiner

THERMAL MANAGEMENT COOLANT VALVES AND PUMPS MODULAR COMBINATION

FIELD

The present disclosure is generally directed toward vehicle cooling systems, and more particularly, toward cooling systems for electric and/or hybrid-electric vehicles.

BACKGROUND

Thermal management through liquid coolant circuits is vital for electric vehicle operation. Liquid cooling systems transfer thermal energy to, from, and/or between the batteries, motors, inverters, and other temperature-sensitive vehicle components and the vehicle's heat exchangers, so as to maintain the temperature of each component (and of the liquid coolant) within operational limits. Failure of a vehicle's liquid cooling system could cause vehicle components to shut down, malfunction, or be destroyed, any one of which occurrences could compromise the safety of the vehicle's occupants.

Highly complex liquid cooling systems comprising large numbers of pumps, valves, and sensors are typically required to ensure that each temperature-sensitive component within an electric or hybrid-electric vehicle is properly cooled. The criticality of such liquid cooling systems to proper vehicle operation further necessitates that redundancies be built into the system, which further elevates the complexity thereof.

U. S. Patent Publication No. 2004/0237912A1, entitled "Electric Coolant Pump Having an Integrated Valve, and Method for Controlling Said Valve," discloses a pump integrated with a valve, where the pump is used to control the valve. U.S. Pat. No. 9,522,609, entitled "Thermal Management System for Fuel Cell Vehicles," describes a multipurpose pump coupled with a 3-way switching valve that can be used in any circuit that needs to be fluid by-passed to temperature protect one component at a time, depending on where the component is located in the thermal system. Applicant incorporates the entirety of these documents herein by reference.

DETAILED DESCRIPTION

Embodiments of the present disclosure will be described in connection with a vehicle, and in some embodiments, an electric vehicle, rechargeable electric vehicle, and/or hybrid-electric vehicle and associated systems.

Figure 1:
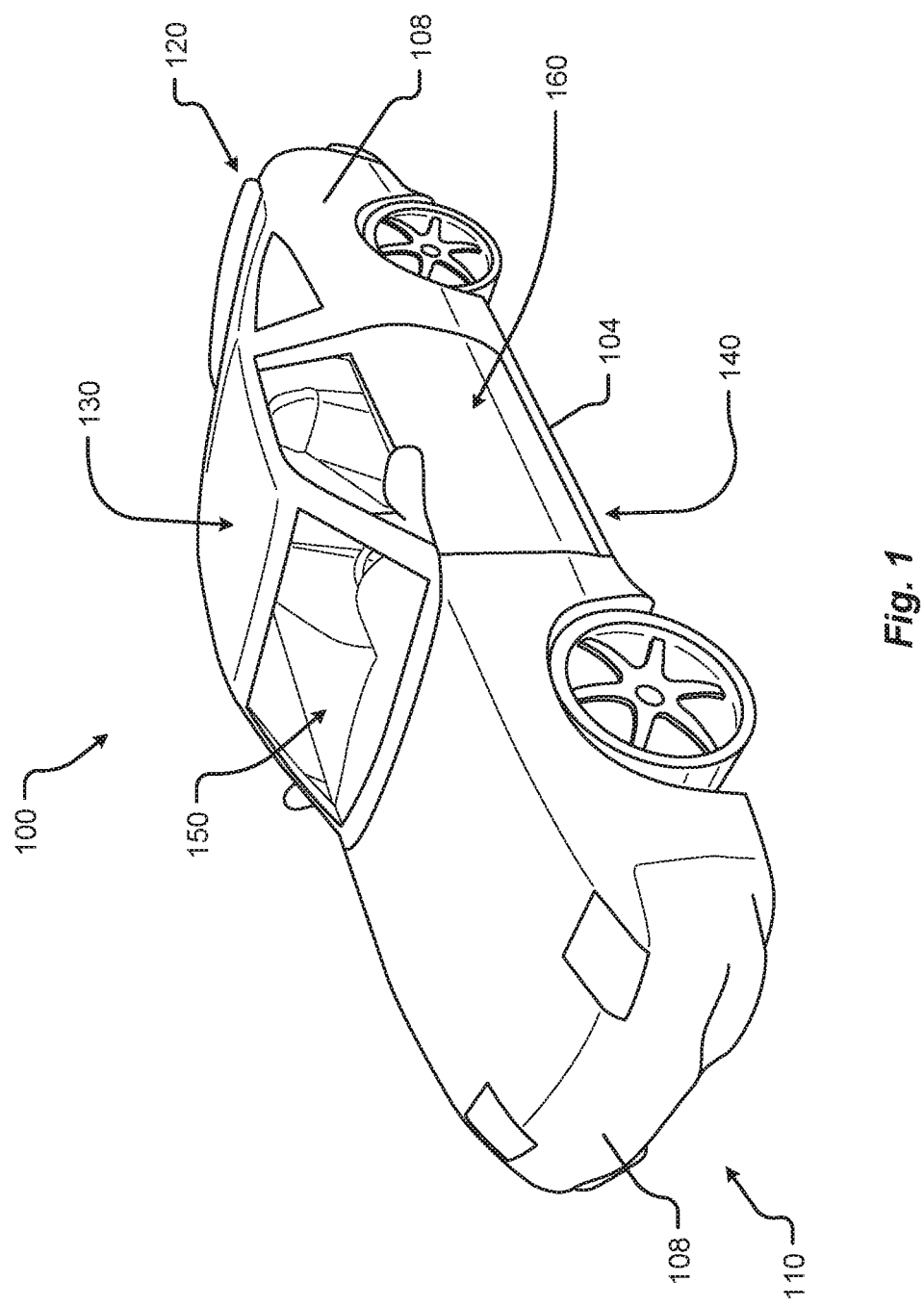
FIG. 1 shows a vehicle in accordance with embodiments of the present disclosure.

FIG. 1 shows a perspective view of a vehicle 100 in accordance with embodiments of the present disclosure. The electric vehicle 100 comprises a vehicle front 110, vehicle aft 120, vehicle roof 130, at least one vehicle side 160, a vehicle undercarriage 140, and a vehicle interior 150. In any event, the vehicle 100 may include a frame 104 and one or more body panels 108 mounted or affixed thereto. The vehicle 100 may include one or more interior components (e.g., components inside an interior space 150, or user space, of a vehicle 100, etc.), exterior components (e.g., components outside of the interior space 150, or user space, of a vehicle 100, etc.), drive systems, controls systems, structural components, etc.

Although shown in the form of a car, it should be appreciated that the vehicle 100 described herein may include any conveyance or model of a conveyance, where the conveyance was designed for the purpose of moving one or more tangible objects, such as people, animals, cargo, and the like. The term "vehicle" does not require that a conveyance moves or is capable of movement. Typical vehicles may include but are in no way limited to cars, trucks, motorcycles, busses, automobiles, trains, railed conveyances, boats, ships, marine conveyances, submarine conveyances, airplanes, space craft, flying machines, human-powered conveyances, and the like.

Figure 2:
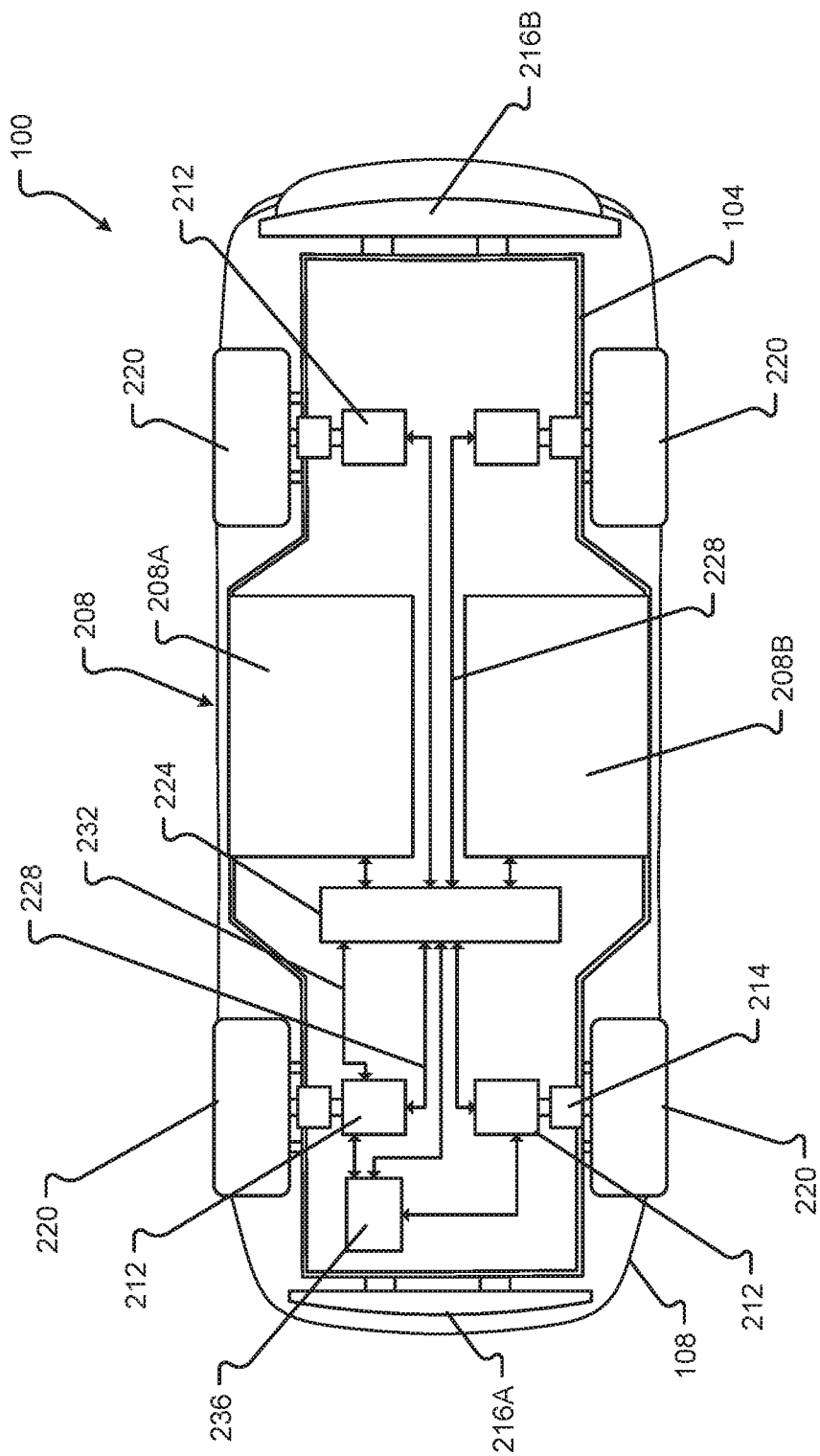
FIG. 2 shows a bottom plan view of the vehicle in accordance with at least some embodiments of the present disclosure.

Referring now to FIG. 2, a plan view of a vehicle 100 will be described in accordance with embodiments of the present disclosure. As provided above, the vehicle 100 may comprise a number of electrical and/or mechanical systems, subsystems, etc. The mechanical systems of the vehicle 100 can include structural, power, safety, and communications subsystems, to name a few. While each subsystem may be described separately, it should be appreciated that the components of a particular subsystem may be shared between one or more other subsystems of the vehicle 100.

The structural subsystem includes the frame 104 of the vehicle 100. The frame 104 may comprise a separate frame and body construction (i.e., body-on-frame construction), a unitary frame and body construction (i.e., a unibody construction), or any other construction defining the structure of the vehicle 100. The frame 104 may be made from one or more materials including, but in no way limited to steel, titanium, aluminum, carbon fiber, plastic, polymers, etc., and/or combinations thereof. In some embodiments, the frame 104 may be, for example, formed, welded, fused, fastened, pressed, combinations thereof, or otherwise shaped to define a physical structure and strength of the vehicle 100. In any event, the frame 104 may comprise one or more surfaces, connections, protrusions, cavities, mounting points, tabs, slots, or other features that are configured to receive other components that make up the vehicle 100. For example, the body panels 108, powertrain subsystem, controls systems, interior components, communications subsystem, and safety subsystem may interconnect with, or attach to, the frame 104 of the vehicle 100.

The frame 104 may include one or more modular system and/or subsystem connection mechanisms. These mechanisms may include features that are configured to provide a selectively interchangeable interface for one or more of the systems and/or subsystems described herein. The mechanisms may provide for a quick exchange, or swapping, of components while providing enhanced security and adaptability over conventional manufacturing or attachment. For instance, the ability to selectively interchange systems and/or subsystems in the vehicle 100 allow the vehicle 100 to adapt to the ever-changing technological demands of society and advances in safety. Among other things, the mechanisms may provide for the quick exchange of, for example, batteries, capacitors, power sources 208A, 208B, motors 212, engines, safety equipment, controllers, user interfaces, interior or exterior components, body panels 108, bumpers 216, sensors, and/or combinations thereof. Additionally or alternatively, the mechanisms may provide unique security hardware and/or software embedded therein that, among other things, can prevent fraudulent or low quality construction replacements from being used in the vehicle 100. Similarly, the mechanisms, subsystems, and/or receiving features in the vehicle 100 may employ poka-yoke, or mistake-proofing, features that ensure a particular mechanism is always interconnected with the vehicle 100 in a correct position, function, etc.

By way of example, complete systems or subsystems may be removed and/or replaced from a vehicle 100 utilizing a single-minute exchange ("SME") principle. In some embodiments, for example, the frame 104 may include slides, receptacles, cavities, protrusions, and/or a number of other features that allow for quick exchange of system components. In one embodiment, the frame 104 may include, for example, tray or ledge features, mechanical interconnection features, locking mechanisms, retaining mechanisms, and/or combinations thereof. In some embodiments, it may be beneficial to quickly remove a used power source 208A, 208B (e.g., battery unit, capacitor unit) from the vehicle 100 and replace the used power source 208A, 208B with a charged or new power source. Continuing this example, the power source 208A, 208B may include selectively interchangeable features that interconnect with the frame 104 or other portion of the vehicle 100. For instance, in a power source 208A, 208B replacement, the quick release features may be configured to release the power source 208A, 208B from an engaged position and slide or move in a direction away from the frame 104 of a vehicle 100. Once removed, or separated from, the vehicle, the power source 208A, 208B may be replaced (e.g., with a new power source, a charged power source, etc.) by engaging the replacement power source into a system receiving position adjacent to the vehicle 100. In some embodiments, the vehicle 100 may include one or more actuators configured to position, lift, slide, or otherwise engage the replacement power source with the vehicle 100. In one embodiment, the replacement power source may be inserted into the vehicle 100 or vehicle frame 104 with mechanisms and/or machines that are external and/or separate from the vehicle 100.

In some embodiments, the frame 104 may include one or more features configured to selectively interconnect with other vehicles and/or portions of vehicles. These selectively interconnecting features can allow for one or more vehicles to selectively couple together and decouple for a variety of purposes. For example, it is an aspect of the present disclosure that a number of vehicles may be selectively coupled together to share energy, increase power output, provide security, decrease power consumption, provide towing services, and/or provide a range of other benefits. Continuing this example, the vehicles may be coupled together based on travel route, destination, preferences, settings, sensor information, and/or some other data. The coupling may be initiated by at least one controller of the vehicle and/or traffic control system upon determining that a coupling is beneficial to one or more vehicles in a group of vehicles or a traffic system. As can be appreciated, the power consumption for a group of vehicles traveling in a same direction may be reduced or decreased by removing any aerodynamic separation between vehicles. In this case, the vehicles may be coupled together to subject only the foremost vehicle in the coupling to air and/or wind resistance during travel. In one embodiment, the power output by the group of vehicles may be proportionally or selectively controlled to provide a specific output from each of the one or more of the vehicles in the group.

The interconnecting, or coupling, features may be configured, for example, as electromagnetic mechanisms, mechanical couplings, electromechanical coupling mechanisms, and/or combinations thereof. The features may be selectively deployed from a portion of the frame 104 and/or body of the vehicle 100. In some cases, the features may be built into the frame 104 and/or body of the vehicle 100. In any event, the features may deploy from an unexposed position to an exposed position or may be configured to selectively engage/disengage without requiring an exposure or deployment of the mechanism from the frame 104 and/or body of the vehicle 100. In some embodiments, the interconnecting features may be configured to interconnect one or more of power, communications, electrical energy, fuel, and/or the like. One or more of the power, mechanical, and/or communications connections between vehicles may be part of a single interconnection mechanism. In some embodiments, the interconnection mechanism may include multiple connection mechanisms. In any event, the single interconnection mechanism or the interconnection mechanism may employ the poka-yoke features as described above.

The power system of the vehicle 100 may include the powertrain, power distribution system, accessory power system, and/or any other components that store power, provide power, convert power, and/or distribute power to one or more portions of the vehicle 100. The powertrain may include the one or more electric motors 212 of the vehicle 100. The electric motors 212 are configured to convert electrical energy provided by a power source into mechanical energy. This mechanical energy may be in the form of a rotational or other output force that is configured to propel or otherwise provide a motive force for the vehicle 100.

In some embodiments, the vehicle 100 may include one or more drive wheels 220 that are driven by the one or more electric motors 212 and motor controllers 214. In some cases, the vehicle 100 may include an electric motor 212 configured to provide a driving force for each drive wheel 220. In other cases, a single electric motor 212 may be configured to share an output force between two or more drive wheels 220 via one or more power transmission components. It is an aspect of the present disclosure that the powertrain may include one or more power transmission components, motor controllers 214, and/or power controllers that can provide a controlled output of power to one or more of the drive wheels 220 of the vehicle 100. The power transmission components, power controllers, or motor controllers 214 may be controlled by at least one other vehicle controller or computer system as described herein.

As provided above, the powertrain of the vehicle 100 may include one or more power sources 208A, 208B. These one or more power sources 208A, 208B may be configured to provide drive power, system and/or subsystem power, accessory power, etc. While described herein as a single power source 208 for sake of clarity, embodiments of the present disclosure are not so limited. For example, it should be appreciated that independent, different, or separate power sources 208A, 208B may provide power to various systems of the vehicle 100. For instance, a drive power source may be configured to provide the power for the one or more electric motors 212 of the vehicle 100, while a system power source may be configured to provide the power for one or more other systems and/or subsystems of the vehicle 100. Other power sources may include an accessory power source, a backup power source, a critical system power source, and/or other separate power sources. Separating the power sources 208A, 208B in this manner may provide a number of benefits over conventional vehicle systems. For example, separating the power sources 208A, 208B allows one power source 208 to be removed and/or replaced independently without requiring that power be removed from all systems and/or subsystems of the vehicle 100 during a power source 208 removal/replacement. For instance, one or more of the accessories, communications, safety equipment, and/or backup power systems, etc., may be maintained even when a particular power source 208A, 208B is depleted, removed, or becomes otherwise inoperable.

In some embodiments, the drive power source may be separated into two or more cells, units, sources, and/or systems. By way of example, a vehicle 100 may include a first drive power source 208A and a second drive power source 208B. The first drive power source 208A may be operated independently from or in conjunction with the second drive power source 208B and vice versa. Continuing this example, the first drive power source 208A may be removed from a vehicle while a second drive power source 208B can be maintained in the vehicle 100 to provide drive power. This approach allows the vehicle 100 to significantly reduce weight (e.g., of the first drive power source 208A, etc.) and improve power consumption, even if only for a temporary period of time. In some cases, a vehicle 100 running low on power may automatically determine that pulling over to a rest area, emergency lane, and removing, or "dropping off," at least one power source 208A, 208B may reduce enough weight of the vehicle 100 to allow the vehicle 100 to navigate to the closest power source replacement and/or charging area. In some embodiments, the removed, or "dropped off," power source 208A may be collected by a collection service, vehicle mechanic, tow truck, or even another vehicle or individual.

The power source 208 may include a GPS or other geographical location system that may be configured to emit a location signal to one or more receiving entities. For instance, the signal may be broadcast or targeted to a specific receiving party. Additionally or alternatively, the power source 208 may include a unique identifier that may be used to associate the power source 208 with a particular vehicle 100 or vehicle user. This unique identifier may allow an efficient recovery of the power source 208 dropped off. In some embodiments, the unique identifier may provide information for the particular vehicle 100 or vehicle user to be billed or charged with a cost of recovery for the power source 208.

The power source 208 may include a charge controller 224 that may be configured to determine charge levels of the power source 208, control a rate at which charge is drawn from the power source 208, control a rate at which charge is added to the power source 208, and/or monitor a health of the power source 208 (e.g., one or more cells, portions, etc.). In some embodiments, the charge controller 224 or the power source 208 may include a communication interface. The communication interface can allow the charge controller 224 to report a state of the power source 208 to one or more other controllers of the vehicle 100 or even communicate with a communication device separate and/or apart from the vehicle 100. Additionally or alternatively, the communication interface may be configured to receive instructions (e.g., control instructions, charge instructions, communication instructions, etc.) from one or more other controllers or computers of the vehicle 100 or a communication device that is separate and/or apart from the vehicle 100.

The powertrain includes one or more power distribution systems configured to transmit power from the power source 208 to one or more electric motors 212 in the vehicle 100. The power distribution system may include electrical interconnections 228 in the form of cables, wires, traces, wireless power transmission systems, etc., and/or combinations thereof. It is an aspect of the present disclosure that the vehicle 100 includes one or more redundant electrical interconnections 232 of the power distribution system. The redundant electrical interconnections 232 can allow power to be distributed to one or more systems and/or subsystems of the vehicle 100 even in the event of a failure of an electrical interconnection portion of the vehicle 100 (e.g., due to an accident, mishap, tampering, or other harm to a particular electrical interconnection, etc.). In some embodiments, a user of a vehicle 100 may be alerted via a user interface associated with the vehicle 100 that a redundant electrical interconnection 232 is being used and/or damage has occurred to a particular area of the vehicle electrical system. In any event, the one or more redundant electrical interconnections 232 may be configured along completely different routes than the electrical interconnections 228 and/or include different modes of failure than the electrical interconnections 228 to, among other things, prevent a total interruption of power distribution in the event of a failure.

In some embodiments, the power distribution system may include an energy recovery system 236. This energy recovery system 236, or kinetic energy recovery system, may be configured to recover energy produced by the movement of a vehicle 100. The recovered energy may be stored as electrical and/or mechanical energy. For instance, as a vehicle 100 travels or moves, a certain amount of energy is required to accelerate, maintain a speed, stop, or slow the vehicle 100. In any event, a moving vehicle has a certain amount of kinetic energy. When brakes are applied in a typical moving vehicle, most of the kinetic energy of the vehicle is lost as the generation of heat in the braking mechanism. In an energy recovery system 236, when a vehicle 100 brakes, at least a portion of the kinetic energy is converted into electrical and/or mechanical energy for storage. Mechanical energy may be stored, for example, as mechanical movement (e.g., in a flywheel, etc.) and electrical energy may be stored, for example, in batteries, capacitors, and/or some other electrical storage system. In some embodiments, electrical energy recovered may be stored in the power source 208. For example, the recovered electrical energy may be used to charge the power source 208 of the vehicle 100.

The vehicle 100 may include one or more safety systems. Vehicle safety systems can include a variety of mechanical and/or electrical components including, but in no way limited to, low impact or energy-absorbing bumpers 216A, 216B, crumple zones, reinforced body panels, reinforced frame components, impact bars, power source containment zones, safety glass, seatbelts, supplemental restraint systems, air bags, escape hatches, removable access panels, impact sensors, accelerometers, vision systems, radar systems, etc., and/or the like. In some embodiments, the one or more of the safety components may include a safety sensor or group of safety sensors associated with the one or more of the safety components. For example, a crumple zone may include one or more strain gages, impact sensors, pressure transducers, etc. These sensors may be configured to detect or determine whether a portion of the vehicle 100 has been subjected to a particular force, deformation, or other impact. Once detected, the information collected by the sensors may be transmitted or sent to one or more of a controller of the vehicle 100 (e.g., a safety controller, vehicle controller, etc.) or a communication device associated with the vehicle 100 (e.g., across a communication network, etc.).

Figure 3:
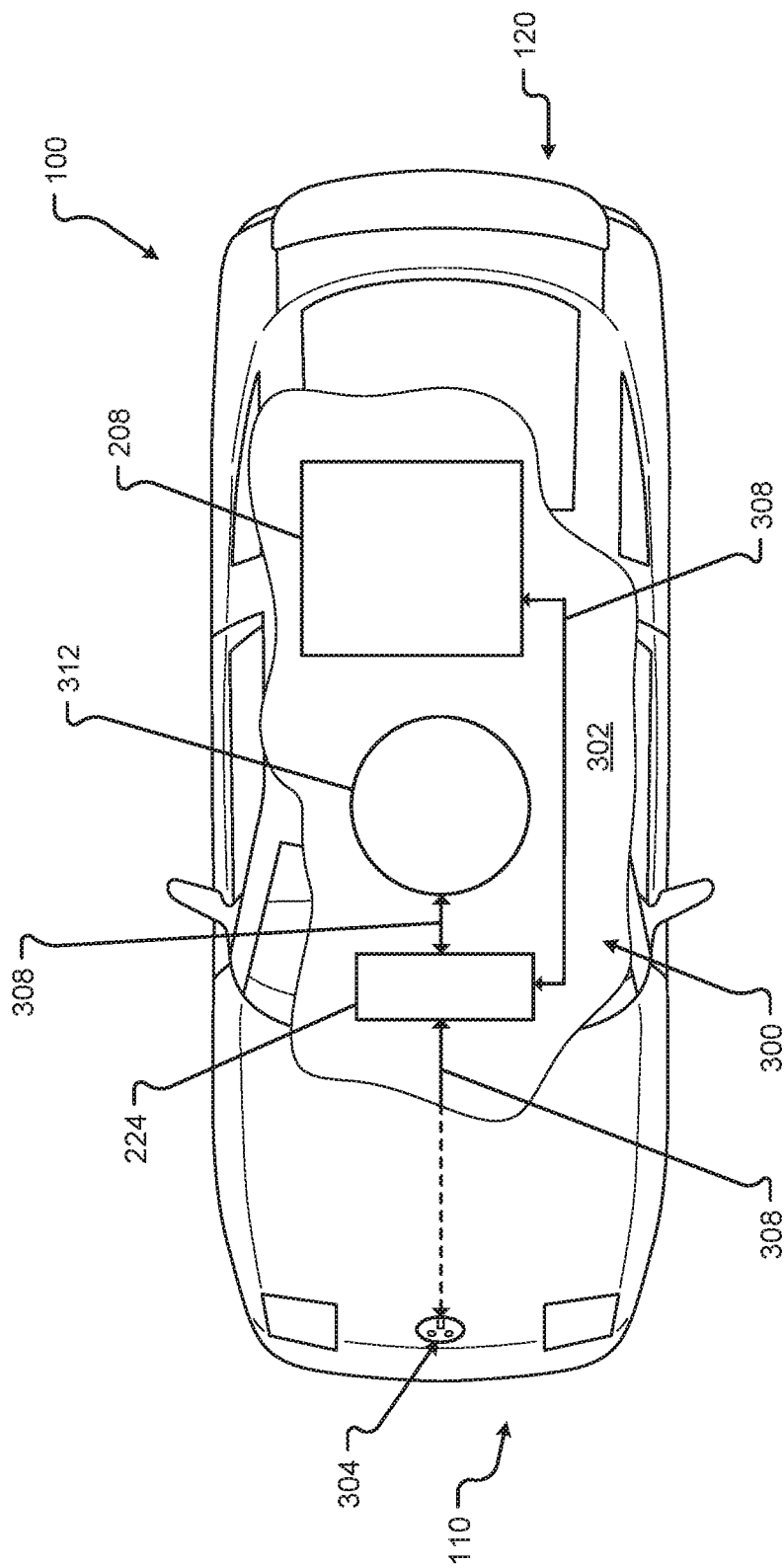
FIG. 3 shows a top plan view of the vehicle in accordance with embodiments of the present disclosure.

FIG. 3 shows a plan view of the vehicle 100 in accordance with embodiments of the present disclosure. In particular, FIG. 3 shows a broken section 302 of a charging system 300 for the vehicle 100. The charging system 300 may include a plug or receptacle 304 configured to receive power from an external power source (e.g., a source of power that is external to and/or separate from the vehicle 100, etc.). An example of an external power source may include the standard industrial, commercial, or residential power that is provided across power lines. Another example of an external power source may include a proprietary power system configured to provide power to the vehicle 100. In any event, power received at the plug/receptacle 304 may be transferred via at least one power transmission interconnection 308. Similar, if not identical, to the electrical interconnections 228 described above, the at least one power transmission interconnection 308 may be one or more cables, wires, traces, wireless power transmission systems, etc., and/or combinations thereof. Electrical energy in the form of charge can be transferred from the external power source to the charge controller 224. As provided above, the charge controller 224 may regulate the addition of charge to at least one power source 208 of the vehicle 100 (e.g., until the at least one power source 208 is full or at a capacity, etc.).

In some embodiments, the vehicle 100 may include an inductive charging system and inductive charger 312. The inductive charger 312 may be configured to receive electrical energy from an inductive power source external to the vehicle 100. In one embodiment, when the vehicle 100 and/or the inductive charger 312 is positioned over an inductive power source external to the vehicle 100, electrical energy can be transferred from the inductive power source to the vehicle 100. For example, the inductive charger 312 may receive the charge and transfer the charge via at least one power transmission interconnection 308 to the charge controller 324 and/or the power source 208 of the vehicle 100. The inductive charger 312 may be concealed in a portion of the vehicle 100 (e.g., at least partially protected by the frame 104, one or more body panels 108, a shroud, a shield, a protective cover, etc., and/or combinations thereof) and/or may be deployed from the vehicle 100. In some embodiments, the inductive charger 312 may be configured to receive charge only when the inductive charger 312 is deployed from the vehicle 100. In other embodiments, the inductive charger 312 may be configured to receive charge while concealed in the portion of the vehicle 100.

In addition to the mechanical components described herein, the vehicle 100 may include a number of user interface devices. The user interface devices receive and translate human input into a mechanical movement or electrical signal or stimulus. The human input may be one or more of motion (e.g., body movement, body part movement, in two-dimensional or three-dimensional space), voice, touch, and/or physical interaction with the components of the vehicle 100. In some embodiments, the human input may be configured to control one or more functions of the vehicle 100 and/or systems of the vehicle 100 described herein. User interfaces may include, but are in no way limited to, at least one graphical user interface of a display device, steering wheel or mechanism, transmission lever or button (e.g., including park, neutral, reverse, and/or drive positions, etc.), throttle control pedal or mechanism, brake control pedal or mechanism, power control switch, communications equipment, etc.

The vehicle sensors and systems may be selected and/or configured to suit a level of operation associated with the vehicle 100. Among other things, the number of sensors used in a system may be altered to increase or decrease information available to a vehicle control system (e.g., affecting control capabilities of the vehicle 100). Additionally or alternatively, the sensors and systems may be part of one or more advanced driver assistance systems (ADAS) associated with a vehicle 100. In any event, the sensors and systems may be used to provide driving assistance at any level of operation (e.g., from fully-manual to fully-autonomous operations, etc.) as described herein.

The various levels of vehicle control and/or operation can be described as corresponding to a level of autonomy associated with a vehicle 100 for vehicle driving operations. For instance, at Level 0, or fully-manual driving operations, a driver (e.g., a human driver) may be responsible for all the driving control operations (e.g., steering, accelerating, braking, etc.) associated with the vehicle. Level 0 may be referred to as a "No Automation" level. At Level 1, the vehicle may be responsible for a limited number of the driving operations associated with the vehicle, while the driver is still responsible for most driving control operations. An example of a Level 1 vehicle may include a vehicle in which the throttle control and/or braking operations may be controlled by the vehicle (e.g., cruise control operations, etc.). Level 1 may be referred to as a "Driver Assistance" level. At Level 2, the vehicle may collect information (e.g., via one or more driving assistance systems, sensors, etc.) about an environment of the vehicle (e.g., surrounding area, roadway, traffic, ambient conditions, etc.) and use the collected information to control driving operations (e.g., steering, accelerating, braking, etc.) associated with the vehicle. In a Level 2 autonomous vehicle, the driver may be required to perform other aspects of driving operations not controlled by the vehicle. Level 2 may be referred to as a "Partial Automation" level. It should be appreciated that Levels 0-2 all involve the driver monitoring the driving operations of the vehicle.

At Level 3, the driver may be separated from controlling all the driving operations of the vehicle except when the vehicle makes a request for the operator to act or intervene in controlling one or more driving operations. In other words, the driver may be separated from controlling the vehicle unless the driver is required to take over for the vehicle. Level 3 may be referred to as a "Conditional Automation" level. At Level 4, the driver may be separated from controlling all the driving operations of the vehicle and the vehicle may control driving operations even when a user fails to respond to a request to intervene. Level 4 may be referred to as a "High Automation" level. At Level 5, the vehicle can control all the driving operations associated with the vehicle in all driving modes. The vehicle in Level 5 may continually monitor traffic, vehicular, roadway, and/or environmental conditions while driving the vehicle. In Level 5, there is no human driver interaction required in any driving mode. Accordingly, Level 5 may be referred to as a "Full Automation" level. It should be appreciated that in Levels 3-5 the vehicle, and/or one or more automated driving systems associated with the vehicle, monitors the driving operations of the vehicle and the driving environment.

Figure 4:
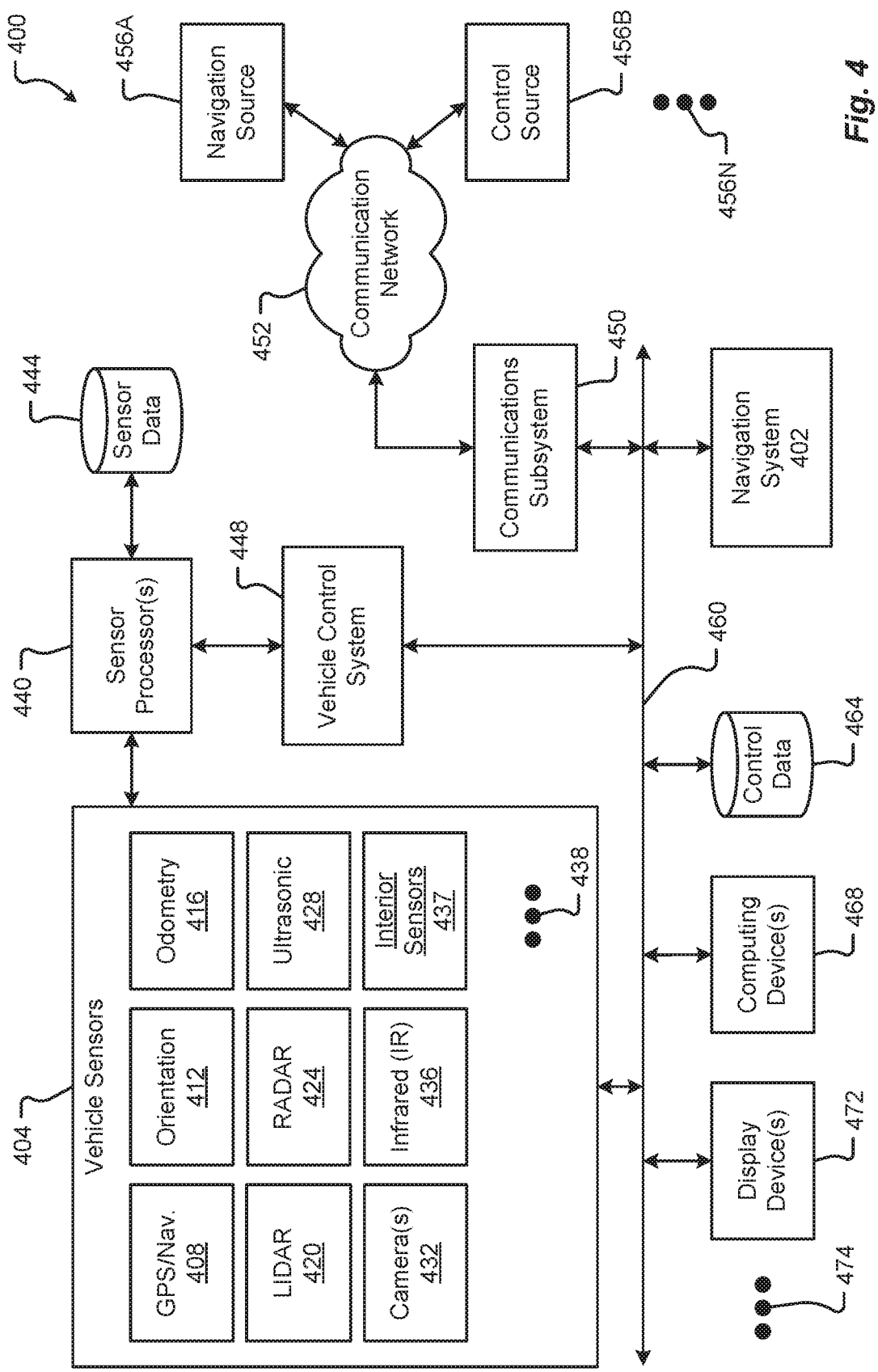
FIG. 4 is a block diagram illustrating an exemplary communication environment of the vehicle in accordance with embodiments of the present disclosure.

FIG. 4 is a block diagram of an embodiment of a communication environment 400 of the vehicle 100 in accordance with embodiments of the present disclosure. The communication system 400 may include one or more vehicle driving vehicle sensors and systems 404, sensor processors 440, sensor data memory 444, vehicle control system 448, communications subsystem 450, control data 464, computing devices 468, display devices 472, and other components 474 that may be associated with a vehicle 100. These associated components may be electrically and/or communicatively coupled to one another via at least one bus 460. In some embodiments, the one or more associated components may send and/or receive signals across a communication network 452 to at least one of a navigation source 456A, a control source 456B, or some other entity 456N.

In accordance with at least some embodiments of the present disclosure, the communication network 452 may comprise any type of known communication medium or collection of communication media and may use any type of protocols, such as SIP, TCP/IP, SNA, IPX, AppleTalk, and the like, to transport messages between endpoints. The communication network 452 may include wired and/or wireless communication technologies. The Internet is an example of the communication network 452 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), such as an Ethernet network, a Token-Ring network and/or the like, a Wide Area Network (WAN), a virtual network, including without limitation a virtual private network ("VPN"); the Internet, an intranet, an extranet, a cellular network, an infra-red network; a wireless network (e.g., a network operating under any of the IEEE 802.9 suite of protocols, the Bluetooth® protocol known in the art, and/or any other wireless protocol), and any other type of packet-switched or circuit-switched network known in the art and/or any combination of these and/or other networks. In addition, it can be appreciated that the communication network 452 need not be limited to any one network type, and instead may be comprised of a number of different networks and/or network types. The communication network 452 may comprise a number of different communication media such as coaxial cable, copper cable/wire, fiber-optic cable, antennas for transmitting/receiving wireless messages, and combinations thereof.

The driving vehicle sensors and systems 404 may include at least one navigation 408 (e.g., global positioning system (GPS), etc.), orientation 412, odometry 416, LIDAR 420, RADAR 424, ultrasonic 428, camera 432, infrared (IR) 436, interior 437, and/or other sensor or system 438.

The navigation sensor 408 may include one or more sensors having receivers and antennas that are configured to utilize a satellite-based navigation system including a network of navigation satellites capable of providing geolocation and time information to at least one component of the vehicle 100. Examples of the navigation sensor 408 as described herein may include, but are not limited to, at least one of Garmin® GLO™ family of GPS and GLONASS combination sensors, Garmin® GPS 15× ™ family of sensors, Garmin® GPS 16× ™ family of sensors with high-sensitivity receiver and antenna, Garmin® GPS 18×OEM family of high-sensitivity GPS sensors, Dewetron DEWE-VGPS series of GPS sensors, GlobalSat 1-Hz series of GPS sensors, other industry-equivalent navigation sensors and/or systems, and may perform navigational and/or geolocation functions using any known or future-developed standard and/or architecture.

The orientation sensor 412 may include one or more sensors configured to determine an orientation of the vehicle 100 relative to at least one reference point. In some embodiments, the orientation sensor 412 may include at least one pressure transducer, stress/strain gauge, accelerometer, gyroscope, and/or geomagnetic sensor. Examples of the navigation sensor 408 as described herein may include, but are not limited to, at least one of Bosch Sensortec BMX 160 series low-power absolute orientation sensors, Bosch Sensortec BMX055 9-axis sensors, Bosch Sensortec BMI055 6-axis inertial sensors, Bosch Sensortec BMI160 6-axis inertial sensors, Bosch Sensortec BMF055 9-axis inertial sensors (accelerometer, gyroscope, and magnetometer) with integrated Cortex M0+ microcontroller, Bosch Sensortec BMP280 absolute barometric pressure sensors, Infineon TLV493D-A1B6 3D magnetic sensors, Infineon TLI493D-W1B6 3D magnetic sensors, Infineon TL family of 3D magnetic sensors, Murata Electronics SCC2000 series combined gyro sensor and accelerometer, Murata Electronics SCC1300 series combined gyro sensor and accelerometer, other industry-equivalent orientation sensors and/or systems, which may perform orientation detection and/or determination functions using any known or future-developed standard and/or architecture.

The odometry sensor and/or system 416 may include one or more components configured to determine a change in position of the vehicle 100 over time. In some embodiments, the odometry system 416 may utilize data from one or more other sensors and/or systems 404 in determining a position (e.g., distance, location, etc.) of the vehicle 100 relative to a previously measured position for the vehicle 100. Additionally or alternatively, the odometry sensors 416 may include one or more encoders, Hall speed sensors, and/or other measurement sensors/devices configured to measure a wheel speed, rotation, and/or number of revolutions made over time. Examples of the odometry sensor/system 416 as described herein may include, but are not limited to, at least one of Infineon TLE4924/26/27/28C high-performance speed sensors, Infineon TL4941plusC(B) single chip differential Hall wheel-speed sensors, Infineon TL5041plusC Giant Mangnetoresistance (GMR) effect sensors, Infineon TL family of magnetic sensors, EPC Model 25SP Accu-CoderPro™ incremental shaft encoders, EPC Model 30M compact incremental encoders with advanced magnetic sensing and signal processing technology, EPC Model 925 absolute shaft encoders, EPC Model 958 absolute shaft encoders, EPC Model MA36S/MA63S/SA36S absolute shaft encoders, Dynapar™ F18 commutating optical encoder, Dynapar™ HS35R family of phased array encoder sensors, other industry-equivalent odometry sensors and/or systems, and may perform change in position detection and/or determination functions using any known or future-developed standard and/or architecture.

The LIDAR sensor/system 420 may include one or more components configured to measure distances to targets using laser illumination. In some embodiments, the LIDAR sensor/system 420 may provide 3D imaging data of an environment around the vehicle 100. The imaging data may be processed to generate a full 360-degree view of the environment around the vehicle 100. The LIDAR sensor/system 420 may include a laser light generator configured to generate a plurality of target illumination laser beams (e.g., laser light channels). In some embodiments, this plurality of laser beams may be aimed at, or directed to, a rotating reflective surface (e.g., a mirror) and guided outwardly from the LIDAR sensor/system 420 into a measurement environment. The rotating reflective surface may be configured to continually rotate 360 degrees about an axis, such that the plurality of laser beams is directed in a full 360-degree range around the vehicle 100. A photodiode receiver of the LIDAR sensor/system 420 may detect when light from the plurality of laser beams emitted into the measurement environment returns (e.g., reflected echo) to the LIDAR sensor/system 420. The LIDAR sensor/system 420 may calculate, based on a time associated with the emission of light to the detected return of light, a distance from the vehicle 100 to the illuminated target. In some embodiments, the LIDAR sensor/system 420 may generate over 2.0 million points per second and have an effective operational range of at least 100 meters. Examples of the LIDAR sensor/system 420 as described herein may include, but are not limited to, at least one of Velodyne® LiDAR™ HDL-64E 64-channel LIDAR sensors, Velodyne® LiDAR™ HDL-32E 32-channel LIDAR sensors, Velodyne® LiDAR™ PUCK™ VLP-16 16-channel LIDAR sensors, Leica Geosystems Pegasus: Two mobile sensor platform, Garmin® LIDAR-Lite v3 measurement sensor, Quanergy M8 LiDAR sensors, Quanergy S3 solid state LiDAR sensor, LeddarTech® LeddarVU compact solid state fixed-beam LIDAR sensors, other industry-equivalent LIDAR sensors and/or systems, and may perform illuminated target and/or obstacle detection in an environment around the vehicle 100 using any known or future-developed standard and/or architecture.

The RADAR sensors 424 may include one or more radio components that are configured to detect objects/targets in an environment of the vehicle 100. In some embodiments, the RADAR sensors 424 may determine a distance, position, and/or movement vector (e.g., angle, speed, etc.) associated with a target over time. The RADAR sensors 424 may include a transmitter configured to generate and emit electromagnetic waves (e.g., radio, microwaves, etc.) and a receiver configured to detect returned electromagnetic waves. In some embodiments, the RADAR sensors 424 may include at least one processor configured to interpret the returned electromagnetic waves and determine locational properties of targets. Examples of the RADAR sensors 424 as described herein may include, but are not limited to, at least one of Infineon RASIC™ RTN7735PL transmitter and RRN7745PL/46PL receiver sensors, Autoliv ASP Vehicle RADAR sensors, Delphi L2C0051TR 77 GHz ESR Electronically Scanning Radar sensors, Fujitsu Ten Ltd. Automotive Compact 77 GHz 3D Electronic Scan Millimeter Wave Radar sensors, other industry-equivalent RADAR sensors and/or systems, and may perform radio target and/or obstacle detection in an environment around the vehicle 100 using any known or future-developed standard and/or architecture.

The ultrasonic sensors 428 may include one or more components that are configured to detect objects/targets in an environment of the vehicle 100. In some embodiments, the ultrasonic sensors 428 may determine a distance, position, and/or movement vector (e.g., angle, speed, etc.) associated with a target over time. The ultrasonic sensors 428 may include an ultrasonic transmitter and receiver, or transceiver, configured to generate and emit ultrasound waves and interpret returned echoes of those waves. In some embodiments, the ultrasonic sensors 428 may include at least one processor configured to interpret the returned ultrasonic waves and determine locational properties of targets. Examples of the ultrasonic sensors 428 as described herein may include, but are not limited to, at least one of Texas Instruments TIDA-00151 automotive ultrasonic sensor interface IC sensors, MaxBotix® MB8450 ultrasonic proximity sensor, MaxBotix® ParkSonar™-EZ ultrasonic proximity sensors, Murata Electronics MA40H1S-R open-structure ultrasonic sensors, Murata Electronics MA40S4R/S open-structure ultrasonic sensors, Murata Electronics MA58MF14-7N waterproof ultrasonic sensors, other industry-equivalent ultrasonic sensors and/or systems, and may perform ultrasonic target and/or obstacle detection in an environment around the vehicle 100 using any known or future-developed standard and/or architecture.

The camera sensors 432 may include one or more components configured to detect image information associated with an environment of the vehicle 100. In some embodiments, the camera sensors 432 may include a lens, filter, image sensor, and/or a digital image processer. It is an aspect of the present disclosure that multiple camera sensors 432 may be used together to generate stereo images providing depth measurements. Examples of the camera sensors 432 as described herein may include, but are not limited to, at least one of ON Semiconductor® MT9V024 Global Shutter VGA GS CMOS image sensors, Teledyne DALSA Falcon2 camera sensors, CMOSIS CMV50000 high-speed CMOS image sensors, other industry-equivalent camera sensors and/or systems, and may perform visual target and/or obstacle detection in an environment around the vehicle 100 using any known or future-developed standard and/or architecture.

The infrared (IR) sensors 436 may include one or more components configured to detect image information associated with an environment of the vehicle 100. The IR sensors 436 may be configured to detect targets in low-light, dark, or poorly-lit environments. The IR sensors 436 may include an IR light emitting element (e.g., IR light emitting diode (LED), etc.) and an IR photodiode. In some embodiments, the IR photodiode may be configured to detect returned IR light at or about the same wavelength to that emitted by the IR light emitting element. In some embodiments, the IR sensors 436 may include at least one processor configured to interpret the returned IR light and determine locational properties of targets. The IR sensors 436 may be configured to detect and/or measure a temperature associated with a target (e.g., an object, pedestrian, other vehicle, etc.). Examples of IR sensors 436 as described herein may include, but are not limited to, at least one of Opto Diode lead-salt IR array sensors, Opto Diode OD-850 Near-IR LED sensors, Opto Diode SA/SHA727 steady state IR emitters and IR detectors, FLIR® LS microbolometer sensors, FLIR® TacFLIR 380-HD InSb MWIR FPA and HD MWIR thermal sensors, FLIR® VOx 640×480 pixel detector sensors, Delphi IR sensors, other industry-equivalent IR sensors and/or systems, and may perform IR visual target and/or obstacle detection in an environment around the vehicle 100 using any known or future-developed standard and/or architecture.

The interior sensors 437 may include passenger compartment temperature sensors (utilized, e.g., in connection with a vehicle climate control system), passenger compartment occupancy sensors (utilized, e.g., in connection with vehicle safety systems, including passive and active restraint systems); wheel-speed sensors (utilized, e.g., in connection with an anti-lock braking system and/or an electronic traction control system); door sensors (utilized, e.g., to communicate to a vehicle operator whether the vehicle doors are locked or unlocked, and/or open or closed); light sensors (utilized, e.g., to automatically adjust the brightness of instrument panel lighting); and electronic system temperature sensors (utilized, e.g., to determine whether vehicle electronic systems are within appropriate operating temperature ranges, and, in some embodiments, to enable a vehicle cooling system to route coolant to electronic systems within the vehicle that are most in need of cooling).

A navigation system 402 can include any hardware and/or software used to navigate the vehicle either manually or autonomously.

In some embodiments, the driving vehicle sensors and systems 404 may include other sensors 438 and/or combinations of the sensors 406-437 described above. Additionally or alternatively, one or more of the sensors 406-437 described above may include one or more processors or controllers configured to process and/or interpret signals detected by the one or more sensors 406-437. In some embodiments, the processing of at least some sensor information provided by the vehicle sensors and systems 404 may be processed by at least one sensor processor 440. Raw and/or processed sensor data may be stored in a sensor data memory 444 storage medium. In some embodiments, the sensor data memory 444 may store instructions used by the sensor processor 440 for processing sensor information provided by the sensors and systems 404. In any event, the sensor data memory 444 may be a disk drive, optical storage device, solid-state storage device such as a random-access memory ("RAM") and/or a read-only memory ("ROM"), which can be programmable, flash-updateable, and/or the like.

The vehicle control system 448 may receive processed sensor information from the sensor processor 440 and determine to control an aspect of the vehicle 100. Controlling an aspect of the vehicle 100 may include presenting information via one or more display devices 472 associated with the vehicle, sending commands to one or more computing devices 468 associated with the vehicle, and/or controlling a driving operation of the vehicle. In some embodiments, the vehicle control system 448 may correspond to one or more computing systems that control driving operations of the vehicle 100 in accordance with the Levels of driving autonomy described above. In one embodiment, the vehicle control system 448 may operate a speed of the vehicle 100 by controlling an output signal to the accelerator and/or braking system of the vehicle. In this example, the vehicle control system 448 may receive sensor data describing an environment surrounding the vehicle 100 and, based on the sensor data received, determine to adjust the acceleration, power output, and/or braking of the vehicle 100. The vehicle control system 448 may additionally control steering and/or other driving functions of the vehicle 100.

The vehicle control system 448 may communicate, in real-time, with the driving sensors and systems 404 forming a feedback loop. In particular, upon receiving sensor information describing a condition of targets in the environment surrounding the vehicle 100, the vehicle control system 448 may autonomously make changes to a driving operation of the vehicle 100. The vehicle control system 448 may then receive subsequent sensor information describing any change to the condition of the targets detected in the environment as a result of the changes made to the driving operation. This continual cycle of observation (e.g., via the sensors, etc.) and action (e.g., selected control or non-control of vehicle operations, etc.) allows the vehicle 100 to operate autonomously in the environment.

In some embodiments, the one or more components of the vehicle 100 (e.g., the driving vehicle sensors 404, vehicle control system 448, display devices 472, etc.) may communicate across the communication network 452 to one or more entities 456A-N via a communications subsystem 450 of the vehicle 100. For instance, the navigation sensors 408 may receive global positioning, location, and/or navigational information from a navigation source 456A. In some embodiments, the navigation source 456A may be a global navigation satellite system (GNSS) similar, if not identical, to NAVSTAR GPS, GLONASS, EU Galileo, and/or the BeiDou Navigation Satellite System (BDS) to name a few.

In some embodiments, the vehicle control system 448 may receive control information from one or more control sources 456B. The control source 456 may provide vehicle control information including autonomous driving control commands, vehicle operation override control commands, and the like. The control source 456 may correspond to an autonomous vehicle control system, a traffic control system, an administrative control entity, and/or some other controlling server. It is an aspect of the present disclosure that the vehicle control system 448 and/or other components of the vehicle 100 may exchange communications with the control source 456 across the communication network 452 and via the communications subsystem 450.

Information associated with controlling driving operations of the vehicle 100 may be stored in a control data memory 464 storage medium. The control data memory 464 may store instructions used by the vehicle control system 448 for controlling driving operations of the vehicle 100, historical control information, autonomous driving control rules, and the like. In some embodiments, the control data memory 464 may be a disk drive, optical storage device, solid-state storage device such as a random-access memory ("RAM") and/or a read-only memory ("ROM"), which can be programmable, flash-updateable, and/or the like.

In addition to the mechanical components described herein, the vehicle 100 may include a number of user interface devices. The user interface devices receive and translate human input into a mechanical movement or electrical signal or stimulus. The human input may be one or more of motion (e.g., body movement, body part movement, in two-dimensional or three-dimensional space, etc.), voice, touch, and/or physical interaction with the components of the vehicle 100. In some embodiments, the human input may be configured to control one or more functions of the vehicle 100 and/or systems of the vehicle 100 described herein. User interfaces may include, but are in no way limited to, at least one graphical user interface of a display device, steering wheel or mechanism, transmission lever or button (e.g., including park, neutral, reverse, and/or drive positions, etc.), throttle control pedal or mechanism, brake control pedal or mechanism, power control switch, communications equipment, etc.

For an autonomous, semi-autonomous, or manually operated electric vehicle 100 as described above, thermal management is critical. For example, the batteries or other power source, inverters, drive motors, and other electrical components need to be sufficiently cooled. Failure to provide sufficient cooling to these components can result in damage or even catastrophic failure of the components. Autonomous vehicles in particular must prove to be resilient to avoid such failures and continue to operate in a safe manner until the vehicle can be driven to a repair location or at least removed from a roadway to a shoulder or parking area.

Figure 5A:
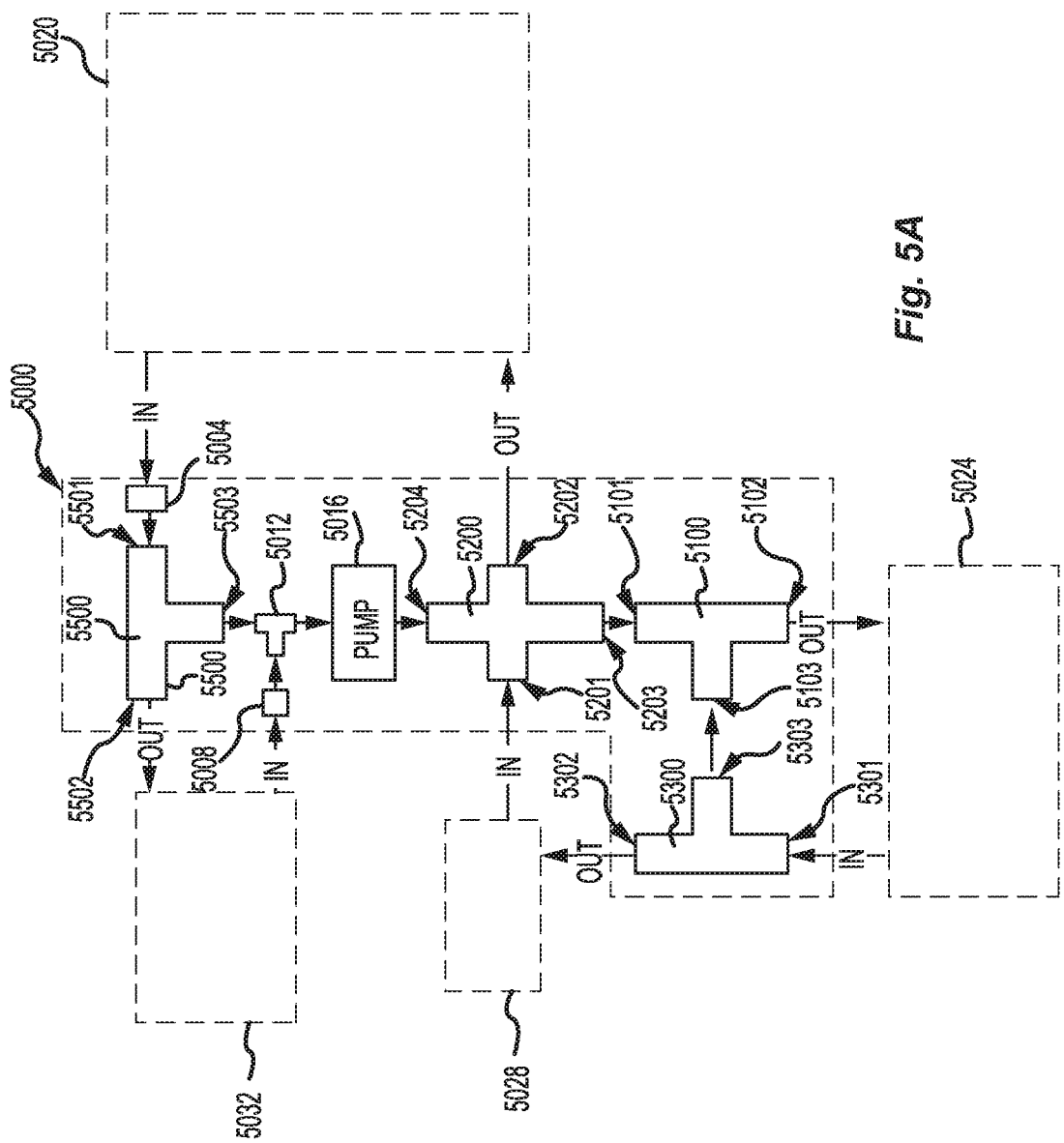
FIG. 5A is a diagram of a thermal management device according to one embodiment of the present disclosure.

Turning now to FIG. 5A, a thermal management device 5000 according to embodiments of the present disclosure comprises a plurality of three-way valves 5100, 5300, and 5500, a four-way valve 5200, a plurality of pressure/temperature sensors 5004 and 4008, a T-joint 5012, and a pump 5016. The three-way valves 5100, 5300, and 5500, the four-way valve 5200, and the pump 5016 are interconnected so as to allow the thermal management device 5000 to route coolant to four separate loops 5020, 5024, 5028, and 5032.

The flow path(s) of the four-way valve 5200 (as well as the flow path of the three-way valves 5100, 5300, and 5500) may be controllable via one or more solenoids configured to move the valves 5100, 5200, 5300, and 5500 from one position to another. The thermal management device 5000 may have a power port through which the thermal management device 5000 receives the power needed to operate the pump 5016 and any solenoids or other electromechanical or electronic components included in the thermal management device 5000. In some embodiments, operation of the one or more solenoids may be controlled by a processor of the thermal management device 5000, or by a processor of a vehicle in which the thermal management device 5000 is installed.

The pump 5016 is configured to pump coolant into the four-way valve 5200 via the port 5204. Coolant entering the port 5204 may be routed to either of the ports 5202 and 5203. Coolant routed through the port 5202 passes through the loop 5020 before re-entering the thermal management device via the pressure/temperature sensor 5004 and the port 5501. The loop 5020 may, in some embodiments, comprise one or more vehicle electronics, the cooling of which may be critical for proper function thereof. The placement of the pressure/temperature sensor 5004 beneficially allows the temperature of coolant flowing out of the loop 5020 (and into the thermal management device 5000) to be monitored. As a result, a processor of the thermal management device 5000 (or of a vehicle in which the thermal management device 5000 is installed) can adjust, based on sensor data received from the pressure/temperature sensor 5004, the coolant flow through the loop 5020 to maintain at an appropriate temperature the components cooled via the loop 5020. In other words, if the temperature of coolant flowing out of the loop 5020 is higher than a predetermined threshold, then the flow of coolant through the loop 5020 may be increased. On the other hand, if the temperature of coolant flowing out of the loop 5020 is lower than a predetermined threshold, then the flow of coolant through the loop 5020 may be decreased (which, in turn, may allow more coolant to be routed elsewhere).

Coolant that returns to the thermal management device 5000 via the pressure/temperature sensor 5004 and the port 5501 of the valve 5500 may be routed through the port 5503 and back to the pump 5016 via the T-joint 5012. Alternatively, the coolant may be routed from the port 5501 to the port 5502, and from the port 5502 into the loop 5032. Although in some embodiments the loop 5032 may comprise additional components to be cooled, in other embodiments the loop 5032 may comprise a radiator configured to reduce the temperature of the coolant, thus preparing the coolant to be pumped through, for example, the loop 5020.

Where the loop 5032 comprises a radiator, the flow path from the three-way valve 5500 to the pump 5016 via the port 5503 and the T-joint 5012 may be considered a radiator bypass path. If the pressure/temperature sensor 5004 detects that coolant flowing therethrough has a temperature lower than a predetermined threshold, then the three-way valve 5500 may be operated to route the coolant back to the pump 5016 so that the coolant can be used for the cooling of vehicle electronics (e.g., in the loop 5020) or for other cooling needs. However, if the pressure/temperature sensor 5004 detects that the coolant flowing therethrough has a temperature higher than a predetermined threshold, then the three-way valve 5500 may be operated to route the coolant to the radiator (e.g., through the loop 5032) so that the temperature of the coolant can be reduced before the coolant is returned to the pump 5016 and again utilized for cooling purposes.

Coolant returning to the thermal management device 5000 from the loop 5032 passes through the pressure/temperature sensor 5008 before entering the T-joint 5012 and being routed to the pump 5016. Data from the pressure/temperature sensor 5008 may be used, for example, to determine the effectiveness of the radiator (where the loop 5032 comprises a radiator), or to determine whether the components of the loop 5032 (where the loop 5032 does not comprise a radiator) are being sufficiently cooled or are in need of additional and/or greater coolant flow.

The pressure/temperature sensors 5004 and 5008 may, in some embodiments, comprise a pipe section or other conduit through which coolant may be routed, together with one or more probes or other components configured to detect the temperature of coolant flowing therethrough. In other embodiments, the pressure/temperature sensors 5004 and 5008 may simply comprise probes that are inserted into the coolant flow path, whether at or near a port such as the port 5501, or elsewhere.

Coolant pumped from the pump 5016 into the four-way valve 5200 may also be routed into the three-way valve 5100 via the ports 5203 and 5101. From the three-way valve 5100, the fluid is routed into the loop 1024 via the port 5102. The loop 5024 may comprise, for example, a heater core that uses hot coolant to warm the air inside the vehicle passenger compartment (thus beneficially lowering the temperature of the coolant, much like a radiator). Additionally or alternatively, the loop 5024 may comprise one or more vehicle components to be cooled by the coolant flowing through the loop 5024.

Coolant exiting the loop 5024 re-enters the thermal management device 5000 via the port 5301, from which the coolant may either be routed back to the three-way valve 5100 via the ports 5303 and 5103 (e.g., for recirculation through the loop 5024), or into the loop 5028 via the port 5302. The loop 5028 may comprise, for example, one or more vehicle batteries, or other heat-producing vehicle components. Where the loop 5024 comprises a heater core, radiator, or other device for extracting heat from coolant, the loop 5024 beneficially prepares the coolant to be routed through the loop 5028, where the coolant will be heated during the process of cooling the battery or other heat-producing vehicle components within the loop 5028. Additionally, where the loop 5028 comprises a vehicle battery, the fluid path from the valve 5300 to the valve 5100 via the ports 5303 and 5103 comprises a battery bypass fluid path, which may be utilized when the battery or other heat-producing vehicle components of the loop 5028 do not need to be cooled, or when coolant exiting the loop 5024 is not sufficiently cooled to provide effective cooling to the battery or other heat-producing vehicle components of the loop 5028.

Coolant exiting the loop 5028 re-enters the thermal management device via the port 5201 of the four-way valve 5200.

The four-way valve 5200 may be configured to alternate between two configurations: a first configuration in which coolant or other fluid entering via the port 5204 is routed to the port 5202, and coolant or other fluid entering the port 5201 is routed to the port 5203; and a second configuration in which coolant or other fluid entering via the port 5204 is routed to the port 5203, and coolant or other fluid entering from the port 5201 is routed to the port 5202. Switching between these two configurations on frequent, regular intervals beneficially allows the pump 5016 to maintain a sufficient pressure differential within the various flow paths enabled by the thermal management device 5000 to ensure that coolant continues to flow through those paths. Switching between these two configurations also beneficially allows coolant from the flow paths comprising loop 5024 and/or loop 5028 to circulate through the flow paths comprising loop 5020 and/or loop 5032, and vice versa. This ability to circulate coolant through different flow paths allows for low-temperature coolant (e.g., coolant that is sufficiently cool to extract heat from a heat-producing vehicle component) to be used where it is needed most, and likewise allows for high-temperature coolant (e.g., coolant that needs to be cooled before it can be used to extract heat from a heat-producing vehicle component) to be circulated through one or more cooling loops (e.g., loop 5032 where loop 5032 comprises a radiator, and/or loop 5024 where loop 5024 comprises a heater core).

Although no pressure/temperature sensors like the sensors 5004 and 5008 are depicted in the flow paths defined by the valves 5100, 5200, and 5300, the thermal management device 5000 may in some embodiments comprise additional pressure/temperature sensors for sensing the pressure and/or temperature of the coolant at one or more points along those flow paths. For example, a pressure/temperature sensor may be useful at or near the port 5301 of the valve 5300, to determine the pressure and/or temperature of coolant entering the thermal management device 5000 from the loop 5024. As another example, a pressure/temperature sensor may be useful at or near the port 5201 of the valve 5200, to determine the pressure and/or temperature of coolant entering the thermal management device 5000 from the loop 5028.

Also in some embodiments, the direction of flow between the valves 5100 and 5300 may be reversible, so that coolant can be circulated from the valve 5100 to the valve 5300 via the ports 5103 and 5303. In such embodiments, the loop 5024 can be bypassed if and when desired. For example, when the four-way valve 5200 is in the second configuration described above, the direction of coolant flow between the three-way valves 5100 and 5300 may be reversed, so that coolant flows from the valve 5100 to the valve 5300 and from the valve 5300 through the loop 5028. In such embodiments, the flow path from the valve 5100 to the valve 5300 acts as a bypass of the loop 5024. This second configuration may beneficially allow coolant that absorbs heat in the loop 5028 (which may be, for example, a battery or other heat-producing device that must be cooled to remain with normal operating temperatures) to be routed through a radiator (which may be located, for example, in the loop 5020 or 5032) and thus passively cooled.

The pump 5016 of the thermal management device 5000 may be any pump suitable for pumping coolant and for use in a vehicle (e.g., with power requirements that can be satisfied by vehicle power systems). As discussed above, the valves 5100, 5200, 5300, and 5500 may comprise one or more solenoids or other electromechanical devices that allow the valves 5100, 5200, 5300, and 5500 to be controlled automatically. The pump 5016 and the valves 5100, 5200, 5300, and 5500, together with the T-joint 5012, may be designed to handle any pressures provided by any pump suitable for use in a vehicle (e.g., with power requirements that can be satisfied by vehicle power systems). The coolant pumped through the thermal management device may be water, a water-glycol mixture, a refrigerant, or any other liquid useful for cooling purposes.

Figure 5B:
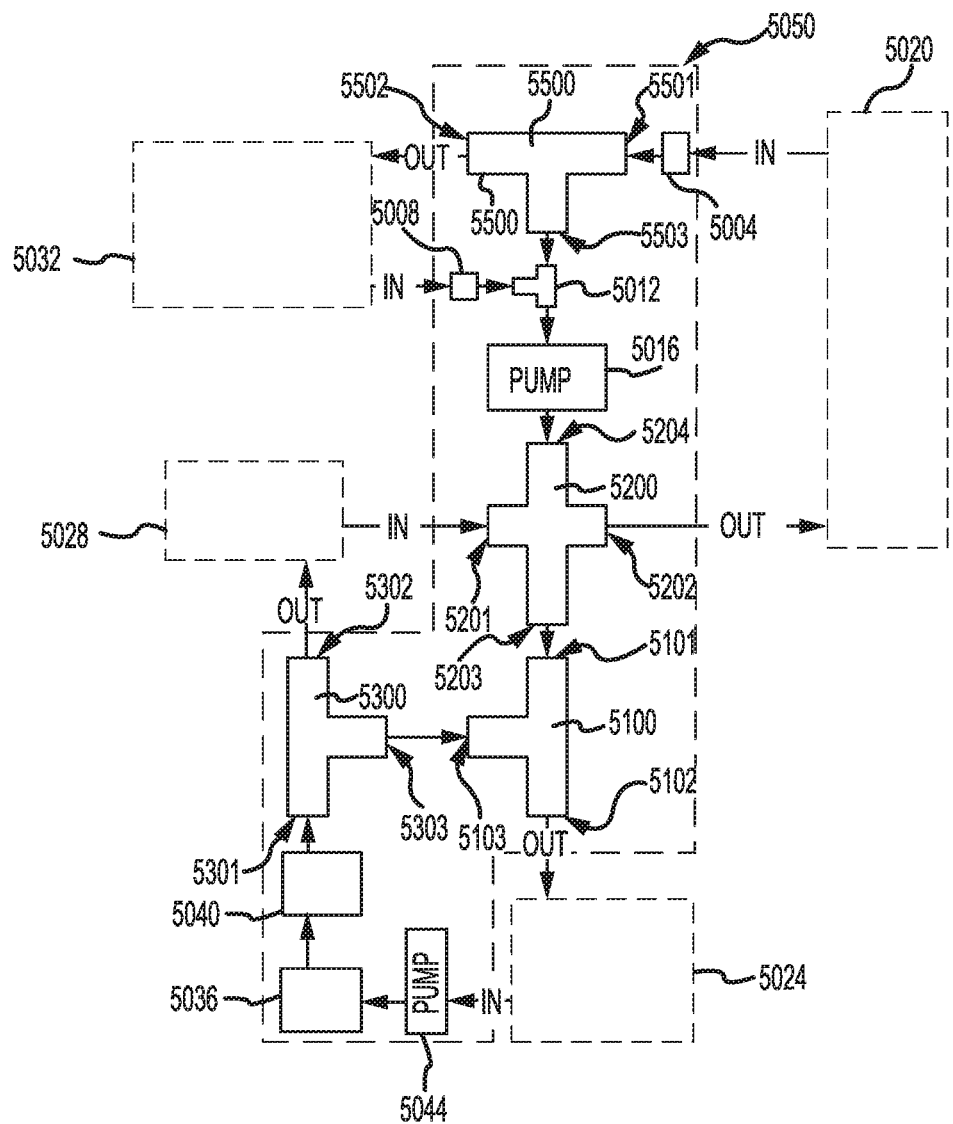
FIG. 5B is a diagram of a thermal management device according to another embodiment of the present disclosure.

FIG. 5B depicts a thermal management device 5050 that is substantially similar to the thermal management device 5000, but includes several additional elements. In particular, the thermal management device 5050 comprises a second pump 5044, a chiller 5036, and a high voltage heater 5040. The second pump 5044 facilitates the maintenance of adequate coolant pressure in the loops 5024 and 5028, particularly when the four-way valve 5200 is in the first configuration described above (e.g., where coolant does not circulate from the loops 5020 and 5032 to or through the loops 5024 and 5028, and vice versa). The chiller 5036 provides an alternative or additional means, beyond a radiator, for extracting heat from coolant exiting the loop 5024 (or otherwise flowing through the thermal management device 5050). The high voltage heater 5040 provides for the efficient conversion of electricity into heat, and thus serves as an additional or alternative heat source beyond, for example, a coolant heater core that may be included in the loop 5024 or any other loop to which the thermal management device 5050 is connected.

The thermal management device 5050 may beneficially utilize a two-stage cooling process, in which coolant is first passed through a radiator (positioned, for example, in the loop 5020), and then passed through the chiller 5036 to achieve maximum cooling of the coolant. Such two-stage cooling may be achieved, for example, by placing the four-way valve 5200 in the second configuration identified above, so that coolant exiting the loop 5020 (or other loop comprising a radiator) may be routed to the flow path that comprises the chiller 5036.

The chiller 5036, the high voltage heater 5040, and the pump 5044 may all be switchable between at least an on position and an off position (if not also switchable between a plurality of on configurations), so as to be utilized when needed but otherwise not.

Although the second pump 5044, the chiller 5036, and the high voltage heater 5040 are depicted as connected in that order, in some embodiments these components may be ordered differently. Additionally, although the second pump 5044, the chiller 5036, and the high voltage heater 5040 are shown positioned between the loop 5024 and the three-way valve 5300, in other embodiments one, two, or all of these components may be positioned elsewhere in the thermal management device 5050. Further, some embodiments may comprise a second pump 5044 but not a chiller 5036 or a high voltage heater 5040, or a second pump 5044 and a chiller 5036 but not a high voltage heater 5040, or a second pump 5044 and a high voltage heater 5040 but not a chiller 5036, or a chiller 5036 but not a second pump 5044 or a high voltage heater 5040, or a high voltage heater 5040 but not a second pump 5044 or a chiller 5036.

Various alternative arrangements of the thermal management devices 5000 and 5050 are included within the scope of the present disclosure. For example, in some embodiments, the thermal management device 5050 may be configured to discharge coolant into the loop 5024 from the port 5303 of the valve 5300, and to receive coolant from the loop 5024 at a T-valve positioned in between the port 5102 of the valve 5100 and the second pump 5044. In such embodiments, coolant would flow directly from the port 5102 of the valve 5100 into the pump 5044. Further, a flow path from the port 5103 of the valve 5100 may lead directly to another T-valve positioned in between the valve 5300 and the loop 5028, so as to bypass the pump 5044, the chiller 5036, the high voltage heater 5040, and the loop 5024.

With respect to both the thermal management device 5000 and the thermal management device 5050, one or more pressure transducers, thermocouples or other temperature sensors, mass flowmeters, volume flowmeters, and/or other sensors may be positioned along any flow path within the thermal management device 5000 and/or 5050. The inclusion of such sensors may be used, for example, to determine which flow paths to open, which flow paths to close, whether and when coolant in a given flow path needs to be cooled, and to otherwise manage the flow of coolant through the thermal management device 5000 or 5050.

Figure 6:
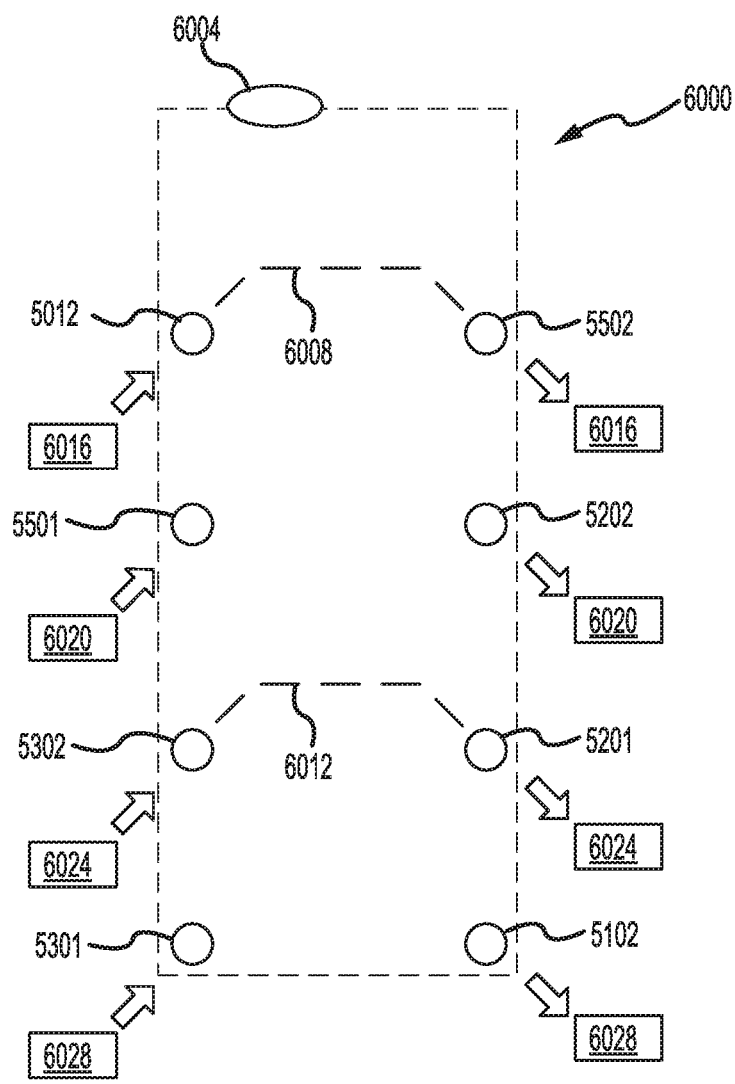
FIG. 6 is a diagram of a thermal management device according to a further embodiment of the present disclosure.

FIG. 6 provides a flow diagram for a thermal management device 6000 that is similar or identical to the thermal management device 5000. The thermal management device 6000 comprises a low voltage connector 6004 through which the thermal management device 6000 receives power for the electrical components thereof, which may include, for example, a pump such as the pump 5016, one or more pressure/temperature sensors such as the pressure/temperature sensors 5004 and 5008, one or more solenoids of one or more valves such as the valves 5100, 5200, 5300, and 5500; and one or more control boards or other electrical components useful for receiving data from the pressure/temperature sensors (and, in some embodiments, from other pressure/temperature sensors not part of the thermal management device 6000) and controlling the pump and/or the solenoids based on such data.

As shown in the flow diagram of FIG. 6, the thermal management device 6000 is configured to circulate fluid through four loops 6016, 6020, 6024, and 6028, with two bypasses 6008 and 6012 for bypassing the loops 6016 and 6024, respectively. The inclusion of bypasses enables coolant to be routed past loops having components where no heat exchange is necessary. For example, if coolant does not need to exchange heat with the radiator, the coolant can be routed through a bypass that skips the radiator (e.g., the bypass 6008). As another example, if a vehicle battery does not need to be cooled by exchanging heat with the coolant, the coolant can be routed through a bypass that skips the vehicle batter (e.g., the bypass 6012). Embodiments of the present disclosure may comprise no bypasses, or one or more bypasses. For example, the thermal management device 6000 may include a bypass for each loop to which the thermal management device 6000 may be connected, or for less than all of the loops to which the thermal management device 6000 may be connected.

For convenience of illustration, the ports of the thermal management device 6000 are described using the same reference numerals as used for the thermal management device 5000. Like reference numerals are intended to refer to identical, or at least substantially similar, components.

The thermal management device 6000 circulates coolant to the loop 6016 via the port 5502 and receives coolant from the loop 6016 via the T-joint 5012. The loop 6016 can be bypassed using the bypass 6008. The loop 6016 may comprise, in some embodiments, a radiator or other heat exchanger configured to extract heat from coolant flowing therethrough. Data from one or more pressure/temperature sensors attached directly or adjacent to one or both of the port 5502 and the T-joint 5012 may be used by a processor or other control circuit of the thermal management device 6000 to determine whether to circulate coolant through the loop 6016 (e.g., if the coolant needs to be cooled before it can be used for cooling purposes) or, alternatively, to bypass the loop 6016 and instead circulate current through the bypass 6008 (e.g., if the coolant is sufficiently cooled to be used for cooling purposes).

The thermal management device 600 circulates coolant to the loop 6020 via the port 5202 and receives coolant from the loop 6020 via the port 5501. The loop 6020 may comprise one or more vehicle or product electronics, or other heat-producing components in need of cooling. Once again, one or more pressure/temperature sensors such as the sensors 5004 and 5008 may be attached directly or adjacent to one or both of the ports 5501 and 5202, and data from such sensors may be used by a processor or other control circuit of the thermal management device 6000 to determine, for example, whether the loop 6020 is being sufficiently cooled, and/or whether the coolant from the loop 6020 needs to be cooled before being recirculated for cooling purposes.

The thermal management device 6000 circulates coolant to the loop 6024 via the port 5201 and receives coolant from the loop 6024 via the port 5302. The loop 6024 may comprise, for example, one or more vehicle batteries, or other heat-producing components in need of cooling. Here also, one or more pressure/temperature sensors such as the sensors 5004 and 5008 may be attached directly or adjacent to one or both of the ports 5201 and 5302, and data from such sensors may be used by a processor or other control circuit of the thermal management device 6000 to determine, for example, whether the loop 6024 is being sufficiently cooled, and/or whether the coolant from the loop 6024 needs to be cooled before being recirculated for cooling purposes, and/or whether to route coolant through the bypass 6012. As will be appreciated based on the present disclosure, the bypass 6012 beneficially allows coolant to be routed directly from the port 5302 to the port 5201 or vice versa, without needing to circulate the coolant through the loop 6024.

Finally, the thermal management device 6000 circulates coolant to the loop 6028 via the port 5102 and receives coolant from the loop 6028 via the port 5301. The loop 6028 may comprise, for example, a heater core, radiator, or other heat exchanger for extracting heat from coolant circulated therethrough. Additionally or alternatively, the loop 6028 may comprise one or more heat-producing components that rely on circulating coolant to avoid overheating. Here once more, one or more pressure/temperature sensors such as the sensors 5004 and 5008 may be attached directly or adjacent to one or both of the ports 5102 and 5301, and data from such sensors may be used by a processor or other control circuit of the thermal management device 6000 to determine, for example, whether the loop 6028 has extracted sufficient heat from the coolant circulated therethrough (where the loop 6028 comprises one or more heat-extracting components), or whether the loop 6028 is being sufficiently cooled (where the loop 6028 comprises one or more heat-producing components).

Various components of the thermal management devices 5000 and 6000 may be permanently interconnected. For example, port 5203 of valve 5200 may be permanently connected to port 5101 of the valve 5100. Similarly, port 5303 of the valve 5300 may be permanently connected to port 5103 of the valve 5100. Further, port 5503 of the valve

5500 may be permanently connected to the T-joint 5012. The use of permanent connections beneficially reduces the need for removable connecting components, which may be installed improperly, or loosen over time, or otherwise fail, and thus cause or permit undesirable leaking of coolant from the thermal management device 5000 or 6000. In some embodiments, the T-joint 5012 may be permanently connected to the pump 5016, and/or the pump 5016 may be permanently connected to the port 5204. In such embodiments, the pump 5016 may or may not be replaceable or repairable.

Regardless of whether the various components of the thermal management devices 5000, 6000 are permanently interconnected, the inclusion in a single device of the components of the thermal management devices 5000, 6000 allows for the elimination of, for example, redundant housings, fasteners, and insulations that would be necessary if each component were installed in a vehicle as a stand-alone unit. Moreover, the thermal management devices 5000, 6000 beneficially reduce the number of single components that must be installed in a vehicular or other thermal circuit, with a corresponding reduction in the quantity of parts numbers, the number of attachment points needed to enable the necessary coolant plumbing, and the amount of attachment hardware needed to install the coolant plumbing (which hardware has both a financial cost and, due to the weight thereof, a fuel efficiency cost). The thermal management devices 5000, 6000 simplify coolant routing by eliminating the need for additional coolant lines to connect stand-alone pumps and/or valves; reduces the amount of space needed; reduces the amount (and thus the cost and weight) of needed coolant plumbing; reduces the number of needed connections (and therefore the number of locations of potential leaks); and reduces the overall cost and weight of the cooling system. In some embodiments, the use of thermal management devices such as the devices 5000, 6000 also beneficially reduces the complexity of the controls needed to manage the cooling system.

In some embodiments, one or more of the valves 5100, 5200, and 5300 may be formed as a single article of manufacture, such that there is a continuous path, for example, from the valve 5200 to the valve 5100 (in place of ports 5203 and 5101), and/or from the valve 5100 to the valve 5300 (in pace of ports 5103 and 5303). Similarly, the T-joint 5012 may in some embodiments be formed as a single piece with the valve 5500, such that there is a continuous path, for example, from the valve 500 to the T-joint 5012 (in place of the port 5503 and corresponding opening of the T-joint 5012).

Figure 7:
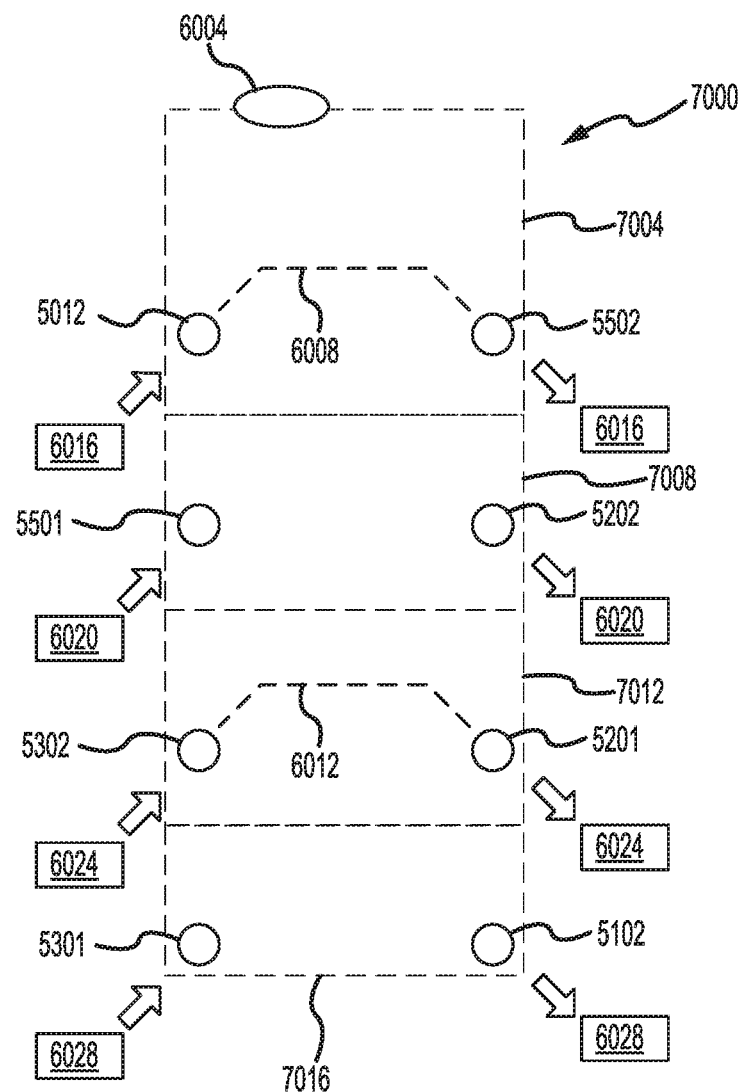
FIG. 7 is a diagram of a modular thermal management device according to yet another embodiment of the present disclosure.

With respect to FIG. 7, a thermal management device 7000 is or may be substantially identical to the thermal management device 6000 but is provided in modular form. Thus, the low voltage connector 6004, the T-joint 5012, the port 5502 (together with the entirety of a valve 5500), and the bypass conduit 6008 may be provided in a first, stand-alone module 7004. The module 7004 may further comprise a pump 5016, one or more pressure/temperature sensors like the pressure/temperature sensors 5004 and 5008, and/or a processor or other control circuit for receiving data from any such pressure/temperature sensors, and/or for controlling the valve 5500, the pump 5016, and/or any other electronic or electromechanical component of the first module 7004. As evident from FIG. 7, the first module 7004 is equipped to circulate coolant through a single loop 6016, or to bypass the loop 6016 using the bypass 6008.

A second module 7008 may be added to the first module 7004 to increase the functionality of the thermal management device 7000. The second module 7008 utilizes the port 5501 of the valve 5500 of the first module 7004, and also includes a valve 5200 with a port 5202. The second module enables coolant to be circulated through a second loop 6020, thus doubling the number of loops that can be serviced by the thermal management device 7000. The second module may be a useful add-on, for example, for vehicles needing cooling/heating or to harvest waste heat from, for example, power electronics, chargers, or motors.

The second module 7008 may additionally comprise one or more pressure/temperature sensors such as the sensors 5004 and 5008. One or more electrical connectors may be provided on the first module 7004 and the second module 7008 for use in establishing a wired connection between the first module 7004 and the second module 7008, for purposes of powering one or more electromechanical components and/or sensors of the second module 7008 (e.g., one or more solenoids on the valve 5200, one or more pressure/temperature sensors), and/or facilitating the transmission of control signals from the first module 7004 to the one or more electromechanical components of the second module 7008, and/or facilitating the transmission of data from the one or more electromechanical components and/or sensors of the second module 7008 to the first module 7004.

A third module 7012 may be added to the first module 7004 and the second module 7008, to further increase the functionality of the thermal management device 7000 and enable coolant to be circulated through a third loop 6024. The third module 7012 utilizes the port 5201 of the valve 5200 of the second module 7008, and further comprises a valve 5300 that in turn comprises a port 5302. The third module 7012 circulates coolant from the port 5201 of the valve 5200 through the loop 6024, and receives coolant from the loop 6024 at the port 5302 of the valve 5300. The third module 7012 also comprises a bypass 6012 through which coolant may be circulated instead of circulating the coolant through the loop 2024. The third module may be a useful add-on for vehicles needing cooling/heating or to harvest waste heat from one or more vehicle batteries.

Like the second module 7008, the third module 7012 may additionally comprise one or more pressure/temperature sensors such as the sensors 5004 and 5008. One or more electrical connectors may be provided on the first or second modules 7004 and 7008 and on the third module 7012 for use in establishing a wired connection between the first and/or second modules 7004 and 7008, respectively, and the third module 7012, for purposes of powering one or more electromechanical components and/or sensors of the third module 7012 (e.g., one or more solenoids on the valve 5300, one or more pressure/temperature sensors), and/or facilitating the transmission of control signals from the first module 7004 (through the second module 7008, in some embodiments) to the one or more electromechanical components of the third module 7012, and/or facilitating the transmission of data from the one or more electromechanical components and/or sensors of the third module 7012 to the first module 7004 (through the second module 7008, in some embodiments).

A fourth module 7016 may be added to the first, second, and third modules 7004, 7008, and 7012, respectively, to provide a yet further increase in the functionality of the thermal management device 7000 by enabling the thermal management device 7000 to circulate coolant through a fourth loop 6028. The fourth module 7016 utilizes the port 5301 of the valve 5300 in the second module 7012, and further comprises a valve 5100 that in turn comprises a port 5102. The fourth module 7016 circulates coolant from the port 5102 of the valve 5100 through the loop 6028 and receives coolant from the loop 6028 at the port 5301 of the valve 5300. The fourth module may be a useful add-on for vehicles using a coolant heater core versus an electric heater for cabin climate control.

Like the second module and third modules 7008 and 7012, the fourth module 7016 may additionally comprise one or more pressure/temperature sensors such as the sensors 5004 and 5008. One or more electrical connectors may be provided on the first, second, and/or third modules 7004, 7008, and 7012, and on the fourth module 7016, for use in establishing a wired connection between the first and fourth modules 7004 and 7016 (whether directly, or indirectly through one or both of the second and third modules 7008 and 7012). Such electrical connections may be used, for example, purposes of powering one or more electromechanical components and/or sensors of the fourth module 7016 (e.g., one or more solenoids on the valve 5100, one or more pressure/temperature sensors), and/or facilitating the transmission of control signals from the first module 7004 (whether directly, or through the second and/or third modules 7008 and 7012) to the one or more electromechanical components of the third module 7016, and/or facilitating the transmission of data from the one or more electromechanical components and/or sensors of the fourth module 7016 to the first module 7004 (whether directly or through the second and/or third modules 7008 and 7012).

Any one or more of the second, third, and fourth modules 7008, 7012, and 7016, respectively, may additionally comprise a second pump 5016 or 5044, a chiller 5036, a high voltage heater 5040, or one or more other components for ensuring the proper and desired operation of the thermal management device 7000.

As will be appreciated, the modular nature of the thermal management device 7000 enables the capacity and functionality of the thermal management device 7000 to be scaled to match the needs of a given thermal circuit. Moreover, the number of modules that may be utilized with the thermal management device 7000 is not limited to four. Additional modules may be added beyond the modules 7004, 7008, 7012, and 7016. Such additional modules, moreover, may comprise one or more additional pumps 5016 and/or other components that are the same as or similar to components already included in the modules 7004, 7008, 7012, and 7016, to ensure that the thermal management device 7000 can meet the demands of the particular thermal circuit in which it is installed.

Although the thermal management devices 5000, 5050, 6000, and 7000 depicted herein are capable of servicing up to four loops, other thermal management devices according to embodiments of the present disclosure may be configured to service five or more loops. Each loop may comprise one or more heat exchangers (e.g., radiators, heater cores, or other heat exchangers) and/or one or more heat-producing components to be cooled. In some embodiments, multiple thermal management devices 5000, 5050, 6000, or 7000 may be included in a single thermal circuit.

Figure 8:
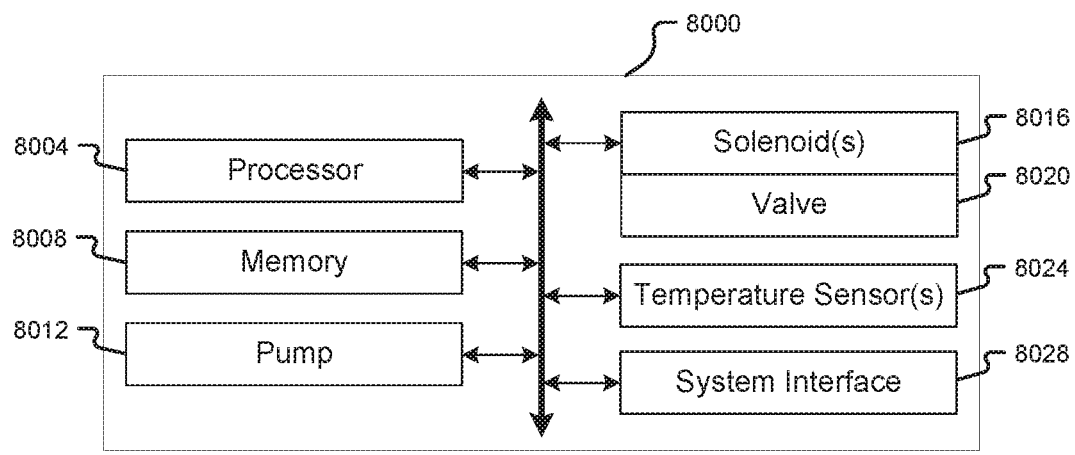
FIG. 8 is a block diagram of a thermal management device according to some embodiments of the present disclosure.

Turning now to FIG. 8, a thermal management device 8000 may comprise a variety of electrical and/or electromechanical components in electrical communication with each other. For example, the thermal management device 8000 may comprise a processor 8004, which may be the same as or similar to other processors described herein. The processor 8004 may correspond to one or many microprocessors that are contained within the housing of the thermal management device 8000. In some embodiments, the processor 8000 incorporates the functions of a Central Processing Unit (CPU) on a single Integrated Circuit (IC) or a few IC chips. The processor 8004 may be a multipurpose, programmable device that accepts digital data as input, processes the digital data according to instructions stored in its internal memory, and provides results as output. The processor 8004 implements sequential digital logic as it has internal memory. As with most known microprocessors, the processor 8004 may operate on numbers and symbols represented in the binary numeral system. The processor 8004 may be configured to execute instructions stored on an internal memory and/or to execute instructions stored on an external memory such as the memory 8008. The processor 8004 may be provided with special packaging to protect it from the variable temperatures and vibrations to which a vehicle-mounted thermal management device such as the device 8000 may be subjected.

The memory 8008 may correspond to any type of non-transitory computer-readable medium. In some embodiments, the memory 8008 may comprise volatile or non-volatile memory and a controller for the same. Non-limiting examples of memory 8008 that may be utilized in the thermal management device 8000 include RAM, DRAM, SDRAM, ROM, buffer memory, flash memory, solid-state memory, or variants thereof. In some embodiments, the memory 8008 may be or comprise a hard disk. The memory 8008 may be provided with special packaging to protect it from the variable temperatures and vibrations to which a vehicle-mounted thermal management device such as the device 8000 may be subjected.

The memory 8008 may be used in connection with the execution of application programming or instructions by the processor 8004. For example, the memory 8008 may store instructions for execution by the processor 8004. The memory 8008 may also be used, for example, for the temporary or long-term storage of data, including, for example, historical configuration information and temperature information (e.g., sensor data) that may be useful for evaluating and/or improving the efficiency of the thermal management device 8000, and/or for troubleshooting in the event of problems in the thermal circuit within which the thermal management device 8000 is installed.

Instructions stored in the memory 8008 may cause the processor 8004, for example, to execute one or more of the following steps: receive coolant pressure and/or temperature information regarding a coolant pressure and/or temperature at one or more pressure/temperature sensors; determine whether the coolant pressure and/or temperature is above a first predetermined maximum threshold, below a first predetermined minimum threshold, or between the first predetermined maximum threshold and the first predetermined minimum threshold; receive system temperature information (e.g., temperature information regarding a vehicle battery system, electronics system, or other heat-producing system) via the system interface 8028; determine whether the received system temperature information is above a second predetermined maximum threshold, below a second predetermined minimum threshold, or in between the second predetermined maximum threshold and the second predetermined minimum threshold; and, based on the determinations, selectively control the pump 8012 and/or selectively activate one or more of the solenoids 8016 to cause coolant to flow through one or more of the loops in which the thermal management device 8000 is installed.

The pump 8012, the valves 8020, and the pressure/temperature sensors 8024 may be the same as or similar to the pump 5016, the valves 5100, 5200, 5300, and 5500, and the pressure/temperature sensors 5004 and 5008, respectively.

Each valve 8020 may have one or more solenoids 8016 provided therewith for switching the valve among its available configurations. In some embodiments, an electromechanical device other than a solenoid may be used to accomplish the switching. Any solenoid or other electromechanical device suitable for switching the valve 8020 between or among desired configurations may be used for the solenoid(s) 8016. The solenoids 8016 are configured to activate (and thus to switch a given valve 8020 from one position to another) upon receipt of a signal from the processor 8004.

The system interface 8028 may beneficially enable the processor 8004 to receive, for example, temperature information about one or more of the various systems within the thermal circuit serviced by the thermal management device 8000. For example, the processor 8004 may receive, through the system interface 8028, information about the temperature of one or more of a vehicle battery, power electronics within the vehicle, chargers within the vehicle, motors within the vehicle, and any other heat-producing components within the vehicle. The processor 8004 may be configured to utilize such temperature information to determine whether and when to route coolant through the flow path that services a component in need of cooling, and/or to determine when and at what speed to operate the pump 8012.

Any of the steps, functions, and operations discussed herein can be performed continuously and automatically.

The exemplary systems and methods of this disclosure have been described in relation to vehicle systems and electric vehicles. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In some embodiments, one or more aspects of the present disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing one or more aspects of the present disclosure illustrated herein can be used to implement the one or more aspects of this disclosure.

Examples provided herein are intended to be illustrative and non-limiting. Thus, any example or set of examples provided to illustrate one or more aspects of the present disclosure should not be considered to comprise the entire set of possible embodiments of the aspect in question. Examples may be identified by the use of such language as "for example," "such as," "by way of example," "e.g.," and other language commonly understood to indicate that what follows is an example.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments include a thermal management device comprising: a pump; a four-way valve comprising a first port configured for attachment to a first external coolant flow path, the four-way valve configured to receive liquid coolant from the pump and selectively route the liquid coolant through the first port; a three-way valve comprising a second port configured for attachment to the first external coolant flow path, the three-way valve configured to receive liquid coolant through the second port and selectively route the liquid coolant to the pump via a third port; and a sensor configured to measure at least one of temperature and pressure of the liquid coolant flowing into the second port.

Aspects include: wherein liquid coolant routed to the pump via the third port flows through a T-joint; wherein the three-way valve comprises a fourth port configured for attachment to a second external coolant flow path, the three-way valve configured to selectively route liquid coolant through the third port; wherein the T-joint comprises an inlet configured for attachment to the second external coolant flow path and an outlet, the T-joint configured to receive liquid coolant through the inlet and route the liquid coolant to the pump via the outlet; a second sensor configured to measure at least one of temperature and pressure of the liquid coolant flowing into the inlet; a second three-way valve comprising a fifth port and a sixth port, the sixth port configured for attachment to a third external coolant flow path, wherein the second three-way valve is configured to receive liquid coolant from the four-way valve and route the liquid coolant through the sixth port; a third three-way valve comprising a seventh port configured for attachment to the third external coolant flow path, wherein the third three-way valve is configured to receive liquid coolant via the seventh port and selectively route the liquid coolant to the second three-way valve; wherein the third three-way valve comprises an eighth port configured for attachment to a fourth external coolant flow path, wherein the third three-way valve is configured to selectively route the liquid coolant through the eighth port or to the second three-way valve; and wherein the four-way valve comprises a ninth port configured for attachment to the fourth external coolant flow path, wherein the four-way valve is configured to receive liquid coolant via the ninth port and selectively route the liquid coolant to the first external coolant flow path or to the second three-way valve.

Embodiments include a thermal management device, comprising: a coolant pump; a plurality of outlets for discharging coolant from the thermal management device; a plurality of inlets for receiving coolant into the thermal management device, wherein the plurality of outlets comprises one outlet for every one of the plurality of inlets; a plurality of valves configured to selectively route coolant among the coolant pump, the plurality of inlets, and the plurality of outlets, the plurality of valves switchable between a first configuration in which each of the plurality of outlets and each of the plurality of inlets is part of a single flow path, and a second configuration in which a first subset of the plurality of outlets and a first subset of the plurality of inlets define a first flow path, and a second subset of the plurality of outlets and a second subset of the plurality of inlets define a second flow path.

Aspects include: a plurality of sensors for measuring at least one of coolant temperature and coolant pressure within the thermal management device and wherein the first and second flow paths are different from each other; wherein the plurality of valves comprises at least one four-way valve; wherein the four-way valve has two positions, one of the two positions corresponding to the first configuration and another of the two positions corresponding to the second configuration; wherein the plurality of valves are configurable to bypass at least one of the plurality of outlets and at least one of the plurality of inlets; and wherein the plurality of valves comprises a plurality of three-way valves and at least one four-way valve.

Embodiments include a modular thermal management device, comprising: a first module comprising: a coolant pump; a three-way valve defining a first outlet; a T-joint defining a first inlet; wherein the first module is configured to pump coolant through a first external fluid path via the first outlet and the first inlet.

Aspects include: a second module detachably connected to the first module, the second module comprising a four-way valve defining a second outlet, wherein the three-way valve defines a second inlet, and the second module is configured to enable the coolant pump to pump coolant through a second external fluid path via the second outlet and the second inlet; a third module detachably connected to the second module, the third module comprising a second three-way valve defining a third inlet, wherein the four-way valve defines a third outlet, and the third module is configured to enable the coolant pump to pump coolant through a third external fluid path via the third outlet and the third inlet; a fourth module detachably connected to the third module, the third module comprising a third three-way valve defining a fourth outlet, wherein the second three-way valve defines a fourth inlet, and the fourth module is configured to enable the coolant pump to pump coolant through a fourth external fluid path via the fourth outlet and the fourth inlet; and a sensor for measuring at least one of coolant temperature and coolant pressure within the first module.

Any one or more of the aspects/embodiments as substantially disclosed herein.

Any one or more of the aspects/embodiments as substantially disclosed herein optionally in combination with any one or more other aspects/embodiments as substantially disclosed herein.

One or means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "electric vehicle" (EV), also referred to herein as an electric drive vehicle, may use one or more electric motors or traction motors for propulsion. An electric vehicle may be powered through a collector system by electricity from off-vehicle sources, or may be self-contained with a battery or generator to convert fuel to electricity. An electric vehicle generally includes a rechargeable electricity storage system (RESS) (also called Full Electric Vehicles (FEV)). Power storage methods may include: chemical energy stored on the vehicle in on-board batteries (e.g., battery electric vehicle or BEV), on board kinetic energy storage (e.g., flywheels), and/or static energy (e.g., by on-board double-layer capacitors). Batteries, electric double-layer capacitors, and flywheel energy storage may be forms of rechargeable on-board electrical storage.

The term "hybrid electric vehicle" refers to a vehicle that may combine a conventional (usually fossil fuel-powered) powertrain with some form of electric propulsion. Most hybrid electric vehicles combine a conventional internal combustion engine (ICE) propulsion system with an electric propulsion system (hybrid vehicle drivetrain). In parallel hybrids, the ICE and the electric motor are both connected to the mechanical transmission and can simultaneously transmit power to drive the wheels, usually through a conventional transmission. In series hybrids, only the electric motor drives the drivetrain, and a smaller ICE works as a generator to power the electric motor or to recharge the batteries. Power-split hybrids combine series and parallel characteristics. A full hybrid, sometimes also called a strong hybrid, is a vehicle that can run on just the engine, just the batteries, or a combination of both. A mid hybrid is a vehicle that cannot be driven solely on its electric motor, because the electric motor does not have enough power to propel the vehicle on its own.

The term "rechargeable electric vehicle" or "REV" refers to a vehicle with onboard rechargeable energy storage, including electric vehicles and hybrid electric vehicles.

What is claimed is:

1. A thermal management device, comprising:
a pump;
a four-way valve comprising a first port configured for attachment to a first coolant flow path external to the thermal management device, the four-way valve configured to receive liquid coolant from the pump and selectively route the liquid coolant through the first port;
a three-way valve comprising a second port configured for attachment to an output of the first coolant flow path, the three-way valve configured to receive liquid coolant through the second port and selectively route the liquid coolant to the pump via a third port, wherein the three-way valve comprises a fourth port configured for attachment to a second coolant flow path external to the thermal management device, the three-way valve configured to selectively route liquid coolant through the third port, wherein liquid coolant routed to the pump via the third port flows through a T-joint, wherein the T-joint comprises an inlet configured for attachment to the second coolant flow path and an outlet, the T-joint configured to receive liquid coolant through the inlet and route the liquid coolant to the pump via the outlet;
a second three-way valve comprising a fifth port and a sixth port, the sixth port configured for attachment to a third coolant flow path external to the thermal management device, wherein the second three-way valve is configured to receive liquid coolant from the four-way valve and route the liquid coolant through the sixth port; and
a sensor configured to measure at least one of a temperature and a pressure of the liquid coolant flowing into the second port,
wherein the thermal management device is installable in a thermal circuit as a single unit.

2. The thermal management device of claim 1, further comprising a third three-way valve comprising a seventh port configured for attachment to the third coolant flow path, wherein the third three-way valve is configured to receive liquid coolant via the seventh port and selectively route the liquid coolant to the second three-way valve.

3. The thermal management device of claim 2, wherein the third three-way valve comprises an eighth port configured for attachment to a fourth coolant flow path external to the thermal management device, wherein the third three-way valve is configured to selectively route the liquid coolant through the eighth port or to the second three-way valve.

4. The thermal management device of claim 3, wherein the four-way valve comprises a ninth port configured for attachment to the fourth coolant flow path, wherein the four-way valve is configured to receive liquid coolant via the ninth port and selectively route the liquid coolant to the first coolant flow path or to the second three-way valve.

5. The thermal management device of claim 1, further comprising a second sensor configured to measure at least one of a temperature and a pressure of the liquid coolant flowing into the inlet.

6. A modular thermal management device, comprising:
a first module comprising:
   a coolant pump;
   a three-way valve defining a first outlet; and
   a T-joint defining a first inlet, the T-joint being separate from the three-way valve and positioned between the coolant pump and the three-way valve;
wherein the first module is configured to pump coolant through a first fluid path external to the modular thermal management device via the first outlet and the first inlet, and
wherein the modular thermal management device is installable in a thermal circuit as a single unit;
a second module detachably connected to the first module, the second module comprising a four-way valve defining a second outlet;
wherein the three-way valve defines a second inlet, and the second module is configured to enable the coolant pump to pump coolant through a second fluid path external to the modular thermal management device via the second outlet and the second inlet; and
a third module detachably connected to the second module, the third module comprising a second three-way valve defining a third inlet;
wherein the four-way valve defines a third outlet, and the third module is configured to enable the coolant pump to pump coolant through a third fluid path external to the modular thermal management device via the third outlet and the third inlet.

7. The modular thermal management device of claim 6, further comprising:
a fourth module detachably connected to the third module, the third module comprising a third three-way valve defining a fourth outlet;
wherein the second three-way valve defines a fourth inlet, and the fourth module is configured to enable the coolant pump to pump coolant through a fourth fluid path external to the modular thermal management device via the fourth outlet and the fourth inlet.

8. The modular thermal management device of claim 6, further comprising:
a sensor for measuring at least one of a coolant temperature and a coolant pressure within the first module.

* * * * *